United States Patent
Rumler et al.

(10) Patent No.: US 12,429,240 B2
(45) Date of Patent: Sep. 30, 2025

(54) SYSTEMS AND METHODS FOR CONFIGURING AND COMMUNICATING WITH HVAC DEVICES

(71) Applicant: Johnson Controls Technology Company, Auburn Hills, MI (US)

(72) Inventors: Daniel R. Rumler, New Berlin, WI (US); Steven L. Whitsitt, Waukesha, WI (US); Robert K. Alexander, Jackson, WI (US); Christopher Merkl, Milwaukee, WI (US); Gary A. Romanowich, Slinger, WI (US); Bernard Clement, Mequon, WI (US); Kevin A. Weiss, Gurnee, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 18/647,771

(22) Filed: Apr. 26, 2024

(65) Prior Publication Data

US 2024/0275431 A1    Aug. 15, 2024

Related U.S. Application Data

(63) Continuation of application No. 17/387,710, filed on Jul. 28, 2021, now Pat. No. 12,034,497, which is a
(Continued)

(51) Int. Cl.
*F24F 11/00* (2018.01)
*F24F 11/30* (2018.01)
(Continued)

(52) U.S. Cl.
CPC .............. *F24F 11/00* (2013.01); *F24F 11/30* (2018.01); *F24F 11/38* (2018.01); *F24F 11/49* (2018.01);
(Continued)

(58) Field of Classification Search
CPC .. F24F 11/00; F24F 11/30; F24F 11/49; F24F 11/526; F24F 11/54; F24F 11/58;
(Continued)

(56) References Cited

U.S. PATENT DOCUMENTS

| | | |
|---|---|---|
| 5,555,195 A | 9/1996 | Jensen et al. |
| 5,736,965 A | 4/1998 | Mosebrook et al. |

(Continued)

FOREIGN PATENT DOCUMENTS

| | | |
|---|---|---|
| CH | 707624 A1 | 8/2014 |
| CN | 102511129 A | 6/2012 |

(Continued)

OTHER PUBLICATIONS

Belimo Aircontrols, "Techinical Documentation, Multi-Function Technology (MFT) for Damper and Control Valve Applications," www.belimo.com, May 2010, 180 pages.

(Continued)

*Primary Examiner* — Kidest Bahta
(74) *Attorney, Agent, or Firm* — Foley & Lardner LLP

(57) ABSTRACT

A sensor in a building HVAC system includes a transducer configured to measure a variable in the building HVAC system and to generate a sensor reading indicating a value of the measured variable. The sensor includes a communications interface configured to provide the sensor reading to a control device in the building HVAC system and a near field communication (NFC) circuit separate from the communications interface. The NFC circuit is configured to facilitate bidirectional NFC data communications between the sensor and a mobile device. The sensor includes a processing circuit having a processor and memory. The processing circuit is configured to wirelessly transmit data stored in the memory of the sensor to the mobile device via the NFC circuit, wirelessly receive data from the mobile device via (Continued)

the NFC circuit, and store the data received from the mobile device in the memory of the sensor.

20 Claims, 19 Drawing Sheets

Related U.S. Application Data continuation of application No. 16/690,104, filed on Nov. 20, 2019, now Pat. No. 11,121,741, which is a continuation of application No. 16/362,004, filed on Mar. 22, 2019, now Pat. No. 11,018,720, which is a continuation of application No. 15/183,699, filed on Jun. 15, 2016, now Pat. No. 10,291,292, which is a continuation-in-part of application No. 14/475,318, filed on Sep. 2, 2014, now Pat. No. 9,732,977.

(51) Int. Cl.

| | | |
|---|---|---|
| *F24F 11/38* | (2018.01) | |
| *F24F 11/49* | (2018.01) | |
| *F24F 11/58* | (2018.01) | |
| *F24F 11/59* | (2018.01) | |
| *F24F 11/62* | (2018.01) | |
| *F24F 11/63* | (2018.01) | |
| *F24F 11/72* | (2018.01) | |
| *F24F 11/81* | (2018.01) | |
| *F24F 11/84* | (2018.01) | |
| *F24F 11/88* | (2018.01) | |
| *G05B 15/02* | (2006.01) | |
| *G05B 19/042* | (2006.01) | |
| *H02J 50/00* | (2016.01) | |
| *H04B 5/79* | (2024.01) | |
| *H04W 52/02* | (2009.01) | |
| *F24F 11/526* | (2018.01) | |
| *F24F 11/54* | (2018.01) | |
| *H04B 5/72* | (2024.01) | |

(52) U.S. Cl.
CPC .............. *F24F 11/58* (2018.01); *F24F 11/59* (2018.01); *F24F 11/62* (2018.01); *F24F 11/63* (2018.01); *F24F 11/72* (2018.01); *F24F 11/81* (2018.01); *F24F 11/84* (2018.01); *F24F 11/88* (2018.01); *G05B 15/02* (2013.01); *G05B 19/0423* (2013.01); *H02J 50/00* (2016.02); *H04B 5/79* (2024.01); *H04W 52/0229* (2013.01); *F24F 11/526* (2018.01); *F24F 11/54* (2018.01); *G05B 2219/15117* (2013.01); *G05B 2219/2231* (2013.01); *G05B 2219/2237* (2013.01); *G05B 2219/23297* (2013.01); *G05B 2219/2614* (2013.01); *G05B 2219/33192* (2013.01); *G05B 2219/33203* (2013.01); *H04B 5/72* (2024.01); *Y02D 30/70* (2020.08)

(58) Field of Classification Search
CPC .. F24F 11/59; F24F 11/62; F24F 11/63; F24F 11/72; F24F 11/81; F24F 11/84; F24F 11/88; G05B 15/02; G05B 19/0423; G05B 2219/15117; G05B 2219/2231; G05B 2219/2237; G05B 2219/23297; G05B 2219/2614; G05B 2219/33192; G05B 2219/33203; H02J 50/00; H04B 5/26; H04B 5/72; H04B 5/79; H04W 52/0229; Y02D 30/70
See application file for complete search history.

(56) References Cited

U.S. PATENT DOCUMENTS

| | | |
|---|---|---|
| 5,982,103 A | 11/1999 | Mosebrook et al. |
| 6,326,758 B1 | 12/2001 | Discenzo |
| 6,798,716 B1 | 9/2004 | Charych |
| 7,030,578 B2 | 4/2006 | Orsat |
| 7,058,524 B2 | 6/2006 | Hayes et al. |
| 7,898,147 B2 | 3/2011 | Grabinger et al. |
| 7,987,247 B2 | 7/2011 | Westphal et al. |
| 8,200,345 B2 | 6/2012 | Li et al. |
| 8,326,465 B2 | 12/2012 | Rosca et al. |
| 8,364,590 B1 | 1/2013 | Casey et al. |
| 8,482,377 B2 | 7/2013 | Finkenzeller |
| 8,550,368 B2 | 10/2013 | Butler et al. |
| 8,588,983 B2 | 11/2013 | Grabinger et al. |
| 8,674,829 B2 | 3/2014 | Karam et al. |
| 8,751,065 B1 | 6/2014 | Kato |
| 8,789,807 B2 | 7/2014 | Kreuter |
| 8,798,796 B2 | 8/2014 | Grohman et al. |
| 9,276,449 B2 | 3/2016 | Kezar |
| 9,514,421 B2 | 12/2016 | Mullin et al. |
| 9,714,771 B1 | 7/2017 | Goodman et al. |
| 9,760,065 B2 | 9/2017 | Song et al. |
| 9,872,126 B2 | 1/2018 | Yarde et al. |
| 9,927,044 B2 | 3/2018 | Kezar |
| 10,006,462 B2 | 6/2018 | Becerra et al. |
| 10,006,654 B2 | 6/2018 | Shaull et al. |
| 10,113,762 B2 | 10/2018 | Grabinger et al. |
| 10,114,387 B2 | 10/2018 | Ellec et al. |
| 10,127,173 B2 | 11/2018 | Schmidlin et al. |
| 10,127,193 B2 | 11/2018 | Kajimoto |
| 10,261,530 B2 | 4/2019 | Schmidlin et al. |
| 10,345,776 B2 | 7/2019 | Cavarec et al. |
| 10,415,844 B2 | 9/2019 | Kreuter |
| 10,419,911 B2 | 9/2019 | Schmidlin et al. |
| 10,440,827 B2 | 10/2019 | Kreuter |
| 2004/0186927 A1 | 9/2004 | Eryurek et al. |
| 2006/0150749 A1 | 7/2006 | Eken et al. |
| 2006/0238365 A1 | 10/2006 | Vecchione et al. |
| 2007/0021140 A1 | 1/2007 | Keyes et al. |
| 2007/0043478 A1 | 2/2007 | Ehlers et al. |
| 2007/0219645 A1 | 9/2007 | Thomas et al. |
| 2007/0262847 A1 | 11/2007 | Grabinger et al. |
| 2008/0082180 A1 | 4/2008 | Blevins et al. |
| 2008/0204240 A1 | 8/2008 | Hilgers et al. |
| 2008/0277486 A1 | 11/2008 | Seem et al. |
| 2009/0164050 A1 | 6/2009 | Ahmad et al. |
| 2009/0243840 A1* | 10/2009 | Petite ................... G08B 25/007 340/539.1 |
| 2010/0190436 A1 | 7/2010 | Cook et al. |
| 2011/0006887 A1 | 1/2011 | Shaull et al. |
| 2011/0010834 A1 | 1/2011 | Park et al. |
| 2011/0047418 A1 | 2/2011 | Drees et al. |
| 2011/0264275 A1 | 10/2011 | Thomle et al. |
| 2011/0313922 A1 | 12/2011 | Ben Ayed |
| 2012/0178367 A1 | 7/2012 | Matsumoto et al. |
| 2012/0290136 A1 | 11/2012 | Romanowich et al. |
| 2012/0299524 A1 | 11/2012 | Amigasaya et al. |
| 2012/0315848 A1 | 12/2012 | Smith et al. |
| 2012/0324119 A1 | 12/2012 | Imes et al. |
| 2013/0049644 A1 | 2/2013 | Neumann |
| 2013/0052946 A1* | 2/2013 | Chatterjee ................ H04W 4/80 455/41.1 |
| 2013/0109404 A1* | 5/2013 | Husney ................... H04W 4/02 455/456.1 |
| 2013/0141223 A1 | 6/2013 | Brandsma et al. |
| 2013/0201316 A1 | 8/2013 | Binder et al. |
| 2013/0214609 A1 | 8/2013 | Carmen, Jr. |
| 2013/0289800 A1 | 10/2013 | Gautama et al. |
| 2013/0300204 A1 | 11/2013 | Partovi |
| 2013/0304758 A1 | 11/2013 | Gruber et al. |
| 2014/0009087 A1 | 1/2014 | Guyer et al. |
| 2014/0045482 A1 | 2/2014 | Bisson et al. |
| 2014/0059483 A1 | 2/2014 | Mairs et al. |
| 2014/0068089 A1 | 3/2014 | Brandsma et al. |
| 2014/0087660 A1* | 3/2014 | Kim ....................... H04L 12/282 455/41.1 |

(56) References Cited

U.S. PATENT DOCUMENTS

| | | | |
|---|---|---|---|
| 2014/0087661 A1 | 3/2014 | Kim et al. | |
| 2014/0094881 A1 | 4/2014 | Dabrowiak et al. | |
| 2014/0097367 A1 | 4/2014 | Burt | |
| 2014/0129036 A1 | 5/2014 | Durbhaka et al. | |
| 2014/0130799 A1 | 5/2014 | Stenzler et al. | |
| 2014/0139323 A1 | 5/2014 | Choo et al. | |
| 2014/0142783 A1 | 5/2014 | Grimm et al. | |
| 2014/0156087 A1 | 6/2014 | Amundson | |
| 2014/0191848 A1 | 7/2014 | Imes et al. | |
| 2014/0358291 A1 | 12/2014 | Wells | |
| 2014/0361758 A1 | 12/2014 | Okuma | |
| 2015/0081928 A1 | 3/2015 | Wintzell et al. | |
| 2015/0100159 A1 | 4/2015 | Park et al. | |
| 2015/0159899 A1* | 6/2015 | Bergman | F24F 11/523 700/276 |
| 2015/0341969 A1 | 11/2015 | Brochu et al. | |
| 2015/0362206 A1 | 12/2015 | Yarde et al. | |
| 2015/0362928 A1* | 12/2015 | Schmidlin | H04W 4/80 700/276 |
| 2015/0369505 A1* | 12/2015 | Malve | F24F 11/64 700/276 |
| 2016/0040899 A1 | 2/2016 | Lee | |
| 2016/0061468 A1 | 3/2016 | Alexander et al. | |
| 2016/0179732 A1 | 6/2016 | Schmidlin et al. | |
| 2016/0268843 A1 | 9/2016 | Baarman | |
| 2016/0294446 A1 | 10/2016 | Rumler et al. | |
| 2017/0063431 A1 | 3/2017 | Milne et al. | |

FOREIGN PATENT DOCUMENTS

| | | | |
|---|---|---|---|
| EP | 2418780 A1 * | 2/2012 | |
| GB | 2 501 765 A | 11/2013 | |
| WO | WO-2007/135598 A1 | 11/2007 | |
| WO | WO-2015/103637 A1 | 7/2015 | |

OTHER PUBLICATIONS

Belimo, "Belimo a Mostra Convegno Expocomfort 2014," YouTube Video: https://www.youtube.com/watch?t=190&v=quanbo1huS4&feature=youtu.be, Mar. 27, 2014 (25 pages).

Chang et al., "A Near Field Communication-Driven Home Automation Framework," Pers Ubiquit Comput, Springer-Verlag London Limited, 2011, 17 pages.

CN Office Action on CN Appl. Ser. No. 201780044005.6, dated Nov. 4, 2020 (27 pages).

Defendant's Preliminary Invalidity Contentions, *Johnson Controls Technology Company* v *Kreuter Manufacturing Co., Inc.*, Case 3:21-cv-00501-DRL-MGG (N.D. Ill.) signed Nov. 4, 2021. 142 pages.

EP Office Action on EP Appl. Ser. No. 17 731 705.4 dated Feb. 15, 2023 (5 pages).

EP Office Action on EP Appl. Ser. No. 17731705.4 dated Jun. 1, 2022 (7 pages).

EP Office Action on EP Appl. Ser. No. 17731705.4, dated Dec. 10, 2020 (8 pages).

EP Office Action on EP Appl. Ser. No. 17731705.4, dated Mar. 4, 2020 (6 pages).

Honeywell Automation and Control Systems, "The RapidZone Solution Application Guide," Honeywell International Inc., www.honeywell.com, revised Jan. 2004, 52 pages.

Honeywell Home and Building Control, "Q769C 0-2 to 10 Vdc Adjustable Adapter for M7405 and M7415 Actuators and W7459 Economizer," Honeywell Inc., revised Jan. 1997, 2 pages.

International Search Report and Written Opinion on PCT/US2017/036614, dated Aug. 3, 2017, 16 pages.

Johnson Controls, "Building Automation System over IP (BAS/IP) Design and Implementation Guide, Cisco Validated Design," Cisco Systems and Johnson Controls, Aug. 15, 2008, 8:1, pp. 1-15, 2-25, 3-20, 4-36 and 1-7, 107 pages.

KMC's Connect Lite: 7 Minutes in Control. Available at URL: https://www.youtube.com/watch?v=BGY_w8yh94M. Uploaded Feb. 23, 2015. 19 pages.

McGrath et al., "Key Sensor Technology Components: Hardware and Software Overview," Sensor Technologies, Jan. 4, 2014, pp. 51-77.

NXP Semiconductors N.V., "NFC for embedded applications", www.nxp.com, Aug. 2014, 20 pages.

St Life.Augmented, "UM1589 User Manual, M24LR-Discovery Kit User Guide," www.st.com, Mar. 2015, 18 pages.

* cited by examiner

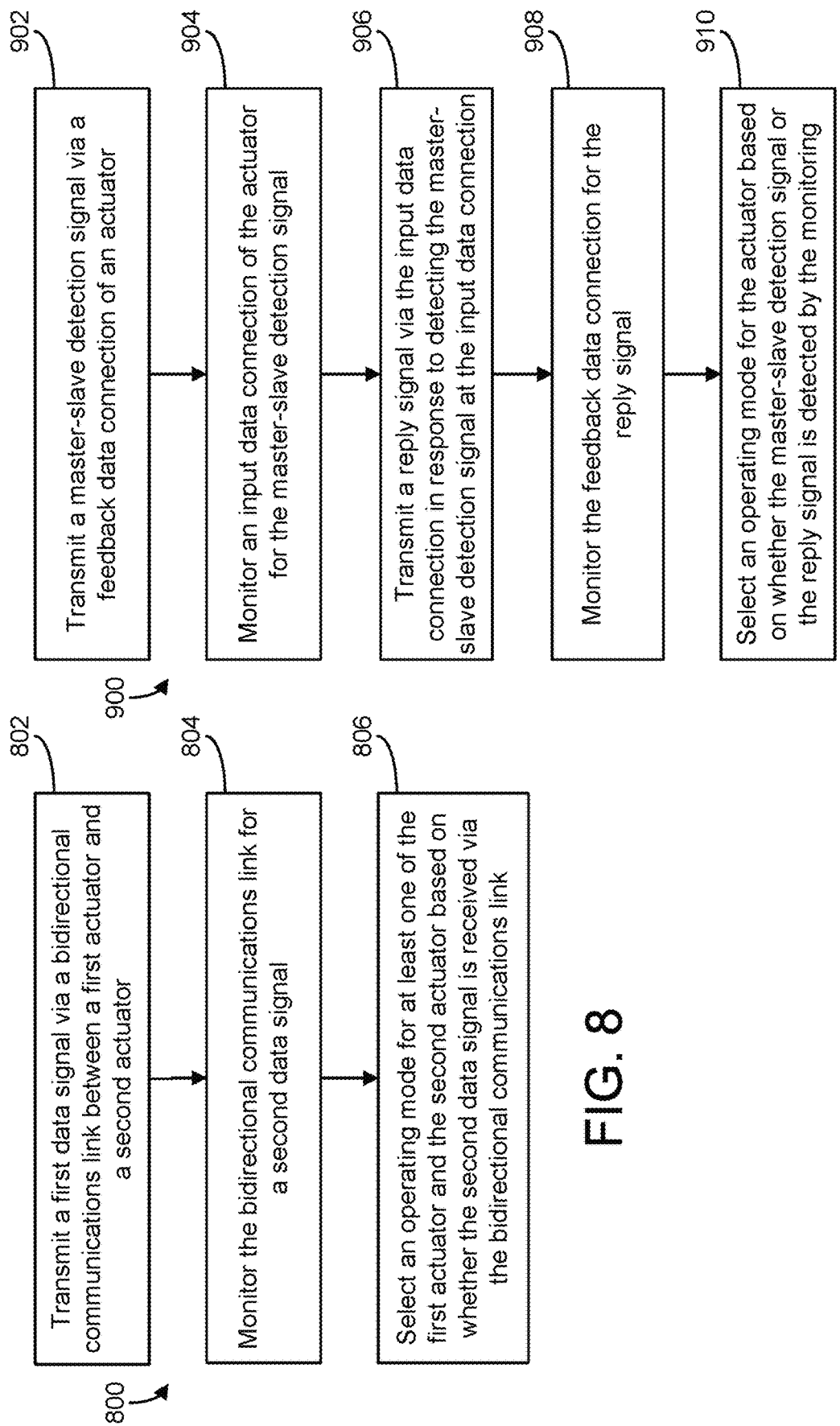

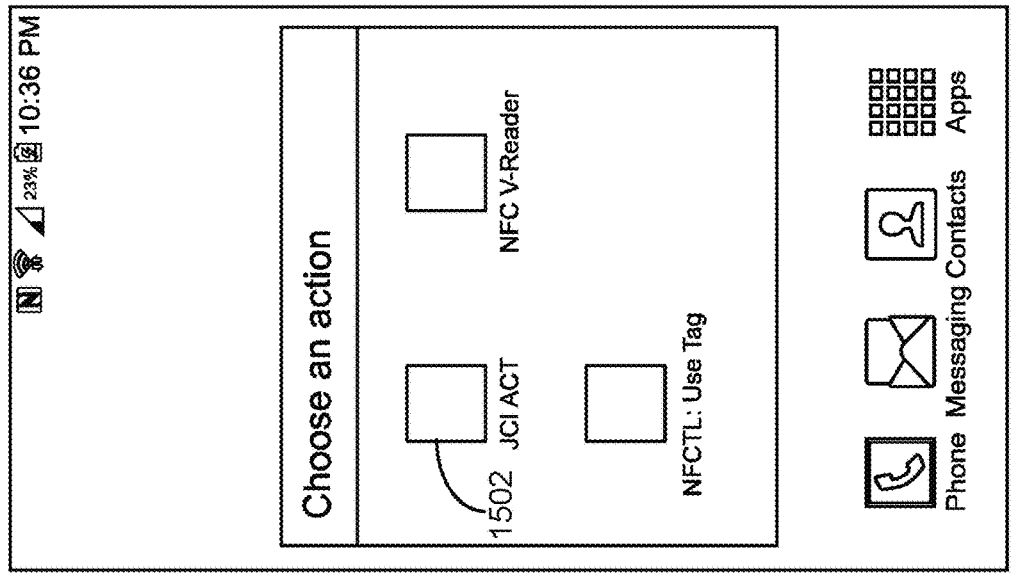

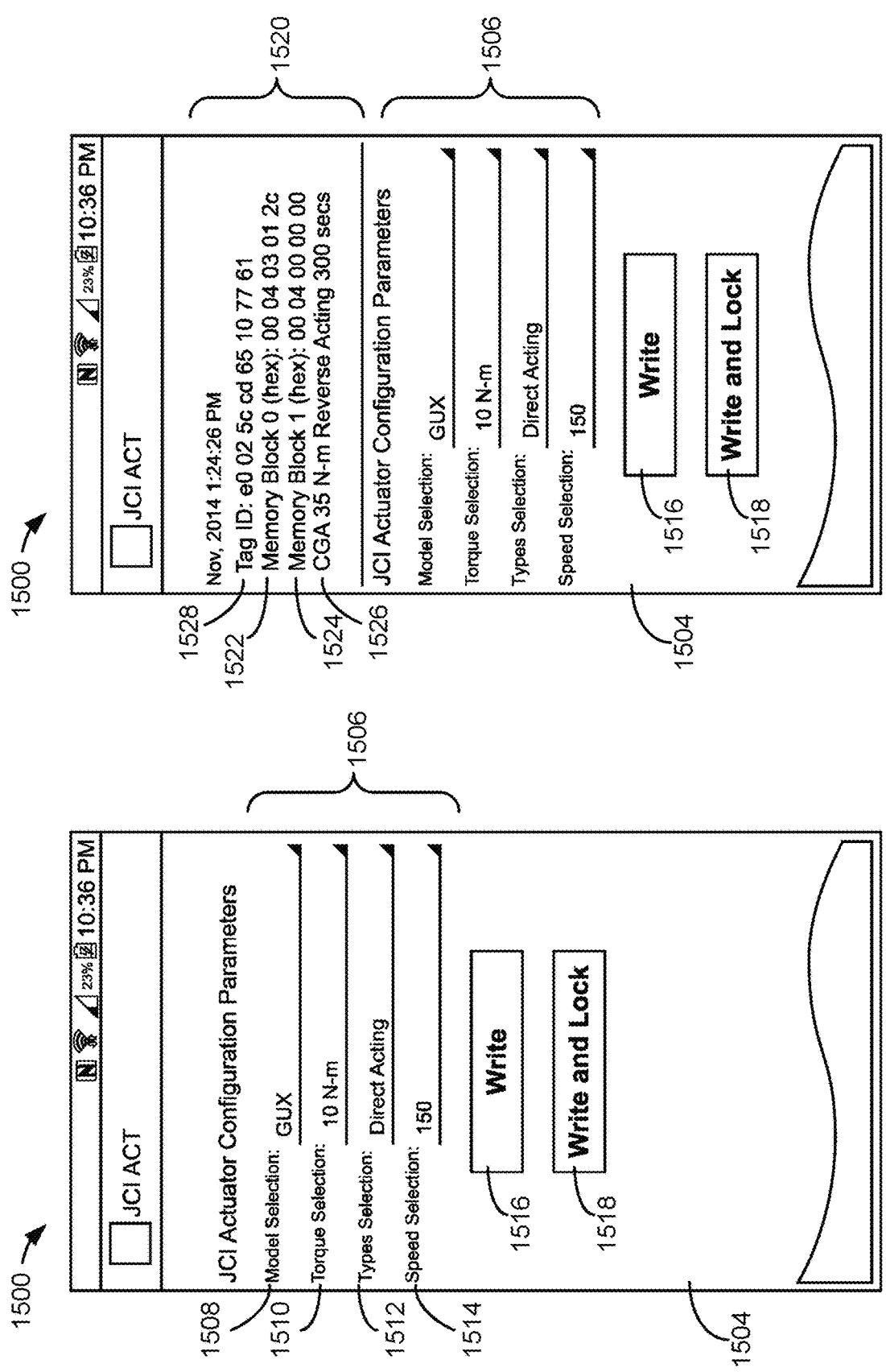

SYSTEMS AND METHODS FOR CONFIGURING AND COMMUNICATING WITH HVAC DEVICES

CROSS-REFERENCE TO RELATED PATENT APPLICATIONS

This application is a continuation of application Ser. No. 17/387,710, filed Jul. 28, 2021, which is a continuation of Ser. No. 16/690,104, filed Nov. 20, 2019, now U.S. Pat. No. 11,121,741, which is a continuation of application Ser. No. 16/362,004, filed Mar. 22, 2019, now U.S. Pat. No. 11,018,720, which is a continuation of application Ser. No. 15/183,699, filed Jun. 15, 2016, now U.S. Pat. No. 10,291,292, which is a continuation-in-part of application Ser. No. 14/475,318, filed Sep. 2, 2014, now U.S. Pat. No. 9,732,977, all of which are incorporated herein by reference in their entireties.

BACKGROUND

The present disclosure relates generally to the field of control equipment such as actuators, sensors, controllers, and other types of devices that can be used for monitoring or controlling an automated system or process. The present disclosure relates more particularly to systems and methods for configuring and communicating with control equipment in a building automation system.

A building automation system (BAS) is, in general, a system of devices configured to control, monitor, and manage equipment in or around a building or building area. A BAS can include a heating, ventilation, and air conditioning (HVAC) system, a security system, a lighting system, a fire alerting system, another system that is capable of managing building functions or devices, or any combination thereof. BAS devices can be installed in any environment (e.g., an indoor area or an outdoor area) and the environment can include any number of buildings, spaces, zones, rooms, or areas. A BAS can include METASYS building controllers or other devices sold by Johnson Controls, Inc., as well as building devices and components from other sources.

A BAS can include one or more computer systems (e.g., servers, BAS controllers, etc.) that serve as enterprise level controllers, application or data servers, head nodes, master controllers, or field controllers for the BAS. Such computer systems can communicate with multiple downstream building systems or subsystems (e.g., an HVAC system, a security system, etc.) according to like or disparate protocols (e.g., LON, BACnet, etc.). The computer systems can also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BAS, its subsystems, and devices. A BAS can include various types of controllable equipment (e.g., chillers, boilers, air handling units, dampers, motors, actuators, pumps, fans, etc.) that can be used to achieve a desired environment, state, or condition within a controlled space.

In some BAS implementations, it can be desirable to arrange two or more actuators in tandem (e.g., in a master-slave configuration). Conventional actuators generally include a physical switch (e.g., a detent potentiometer) attached to the actuator for configuring the actuator to operate as either the master or the slave in a master-slave configuration. It can be challenging to properly configure tandem-mounted actuators, especially when access to the actuators is restricted or when the proper master-slave configuration is unclear.

Other types of control equipment also generally require physical access to the equipment for various activities such as commissioning, programming, setting addresses, installing firmware, performing diagnostics, and/or reading a current operating status. For example, physical access to the circuit board of a control device can be required to program the device. It can be difficult to access control devices that are mounted in a confined space or sealed from the external environment.

SUMMARY

One implementation of the present disclosure is an actuator in a HVAC system. The actuator includes a mechanical transducer, an input data connection, a feedback data connection, and a processing circuit. The processing circuit is configured to use a master-slave detection signal communicated via the feedback data connection to select an operating mode for the actuator from a set of multiple potential operating modes including a master operating mode and a slave operating mode. The processing circuit is configured to operate the mechanical transducer in response to a control signal received via the input data connection according to the selected operating mode.

In some embodiments, the processing circuit is configured to generate the master-slave detection signal and to output the master-slave detection signal via the feedback data connection.

In some embodiments, the processing circuit is configured to monitor the feedback data connection for a reply signal from another actuator. The reply signal can be generated by the other actuator in response to receiving the output master-slave detection signal. The processing circuit can be configured to select the master operating mode in response to detecting the reply signal from the other actuator at the feedback data connection.

In some embodiments, the processing circuit is configured to monitor the input data connection for the master-slave detection signal. The master-slave detection signal can be generated by another actuator. The processing circuit can be configured to select the slave operating mode in response to detecting the master-slave detection signal from the other actuator at the input data connection.

In some embodiments, the processing circuit is configured to generate a reply signal in response to detecting the master-slave detection signal at the input data connection. The processing circuit can be configured to output the reply signal via the input data connection.

In some embodiments, the processing circuit is configured to monitor the input data connection for the master-slave detection signal and to monitor the feedback data connection for a reply signal. The processing circuit can be configured to select a normal operating mode in response to a determination that the master-slave detection signal is not detected at the input data connection and the reply signal is not detected at the feedback data connection.

In some embodiments, the processing circuit is configured to engage in bi-directional communications with another actuator via the feedback data connection. The feedback data connection can be connected with an input data connection of the other actuator.

In some embodiments, the processing circuit is configured to engage in bi-directional communications with another actuator via the input data connection. The input data connection can be connected with a feedback data connection of the other actuator.

In some embodiments, the actuator further includes memory storing instructions for generating the master-slave detection signal. The processing circuit can generate the master-slave detection signal according to the stored instructions. In some embodiments, the master-slave detection signal includes a series of digital pulses.

In some embodiments, the processing circuit includes a master detection circuit configured to monitor the input data connection for the master-slave detection signal, to generate a reply signal in response to detecting the master-slave detection signal at the input data connection, and to output the reply signal via the input data connection. In some embodiments, the processing circuit includes a slave detection circuit configured to generate the master-slave detection signal, to output the master-slave detection signal via the feedback data connection, and to monitor the feedback data connection for the reply signal.

Another implementation of the present disclosure is an actuator in a HVAC system. The actuator includes a mechanical transducer and a processing circuit having a processor and memory. The processing circuit is configured to operate the mechanical transducer according to a control program stored in the memory. The actuator further includes a wireless transceiver configured to facilitate bidirectional wireless data communications between the processing circuit and an external device. The actuator further includes a power circuit configured to draw power from a wireless signal received via the wireless transceiver and to power the processing circuit and the wireless transceiver using the drawn power. The processing circuit is configured to use the power drawn from the wireless signal to wirelessly transmit data stored in the memory of the actuator to the external device via the wireless transceiver, to wirelessly receive data from the external device via the wireless transceiver, and to store the data received from the external device in the memory of the actuator.

In some embodiments, the external device is a mobile device. The bidirectional wireless data communications between the processing circuit and the external device can include direct communications between the wireless transceiver of the actuator and a wireless transceiver of the mobile device.

In some embodiments, the processing circuit is configured to wirelessly exchange data with the external device without requiring any wired power or data connections to the actuator. In some embodiments, the processing circuit is configured to wirelessly exchange data with the external device while the actuator is contained within packaging that prevents physical access to the actuator.

In some embodiments, the data received from the external device includes firmware for the actuator. The firmware can include the control program used by the processing circuit to operate the mechanical transducer. The control program can include logic for operating the mechanical transducer based on variable configuration parameters separate from the control program.

In some embodiments, at least one of the data transmitted to the external device and the data received from the external device include configuration parameters for the actuator.

In some embodiments, the processing circuit is capable of operating multiple different actuator models. The data received from the external device can include model identification parameters identifying a particular actuator model and defining configuration settings specific to the identified actuator model. The processing circuit can use the model identification parameters to operate the actuator according to configuration settings specific to the identified actuator model.

In some embodiments, the processing circuit is configured to perform an actuator diagnostic test and to generate diagnostic information as a result of the test. The data transmitted to the external device can include the diagnostic information generated by the processing circuit.

In some embodiments, the external device is another actuator and at least one of the data transmitted to the external device and the data received from the external device include a master-slave detection signal. The processing circuit can be configured to use the master-slave detection signal to select an operating mode for the actuator from a set of multiple potential operating modes including a master operating mode and a slave operating mode Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

Another implementation of the present disclosure is a sensor in a building HVAC system. The sensor includes a transducer configured to measure a variable in the building HVAC system and to generate a sensor reading indicating a value of the measured variable. The sensor includes a communications interface configured to provide the sensor reading to a control device in the building HVAC system and a near field communication (NFC) circuit separate from the communications interface. The NFC circuit is configured to facilitate bidirectional NFC data communications between the sensor and a mobile device. The sensor includes a processing circuit having a processor and memory. The processing circuit is configured to wirelessly transmit data stored in the memory of the sensor to the mobile device via the NFC circuit, wirelessly receive data from the mobile device via the NFC circuit, and store the data received from the mobile device in the memory of the sensor.

In some embodiments, the processing circuit is configured to wirelessly exchange data with the mobile device while the processing circuit is contained within packaging that prevents physical access to the processing circuit.

In some embodiments, the communications interface is a wireless communications interface.

In some embodiments, the communications interface operates using a communications protocol that is not NFC and transmits a data set different than the data set communicated via NFC.

In some embodiments, the NFC circuit includes a wireless transceiver configured to facilitate bidirectional wireless data communications between the processing circuit and an external device. The NFC circuit can include a power circuit configured to draw power from a wireless signal received via the wireless transceiver and to power the processing circuit and the wireless transceiver using the drawn power. The processing circuit is configured to use the power drawn from the wireless signal to wirelessly transmit data stored in the memory of the actuator to the external device via the wireless transceiver, to wirelessly receive data from the external device via the wireless transceiver, and to store the data received from the external device in the memory of the actuator.

In some embodiments, the processing circuit is configured to operate in a low-power mode. The NFC circuit is configured to transmit a wake-up signal to the processing circuit to cause the processing circuit to exit the low-power mode.

In some embodiments, the processing circuit is capable of operating multiple different sensor models. The data received from the external device includes model identification parameters identifying a particular sensor model and defining configuration settings specific to the identified sensor model. The processing circuit uses the model identification parameters to operate the sensor according to configuration settings specific to the identified actuator model.

In some embodiments, the mobile device runs an application configured to facilitate the bidirectional NFC data communications between the sensor and the mobile device.

Another implementation of the present disclosure is a building device. The building device includes a mechanical transducer and a processing circuit having a processor and memory. The processing circuit is configured to operate the mechanical transducer according to a control program stored in the memory. The building device further includes a near field communication (NFC) circuit configured to facilitate bidirectional NFC data communications between the building device and a mobile device. The processing circuit is configured to wirelessly transmit data stored in the memory of the building device to the mobile device via the NFC circuit, wirelessly receive data from the mobile device via the NFC circuit, and store the data received from the mobile device in the memory of the building device.

In some embodiments, the processing circuit is configured to wirelessly exchange data with the mobile device while the processing circuit is contained within packaging that prevents physical access to the processing circuit.

In some embodiments, the communications interface is a wireless communications interface.

In some embodiments, the communications interface operates using a communications protocol that is not NFC and transmits a data set different than the data set communicated via NFC.

In some embodiments, the NFC circuit includes a wireless transceiver configured to facilitate bidirectional wireless data communications between the processing circuit and an external device. The NFC circuit can include a power circuit configured to draw power from a wireless signal received via the wireless transceiver and to power the processing circuit and the wireless transceiver using the drawn power. The processing circuit is configured to use the power drawn from the wireless signal to wirelessly transmit data stored in the memory of the actuator to the external device via the wireless transceiver, to wirelessly receive data from the external device via the wireless transceiver, and to store the data received from the external device in the memory of the actuator.

In some embodiments, the processing circuit is configured to operate in a low-power mode. The NFC circuit is configured to transmit a wake-up signal to the processing circuit to cause the processing circuit to exit the low-power mode.

In some embodiments, the processing circuit is capable of operating multiple different building device models. The data received from the external device includes model identification parameters identifying a particular building device model and defining configuration settings specific to the identified building device model. The processing circuit uses the model identification parameters to operate the building device according to configuration settings specific to the identified actuator model.

In some embodiments, the mobile device runs an application configured to facilitate the bidirectional NFC data communications between the building device and the mobile device.

Another implementation of the present disclosure is a method for configuring and communicating with a building device. The method includes establishing a bidirectional near field communications (NFC) link between the building device and a mobile device via a NFC circuit of the building device, wirelessly transmitting data stored in a memory of the building device to the mobile device via the NFC circuit, wirelessly receiving data from the mobile device via the NFC circuit, and storing the data received from the mobile device in the memory of the building device.

In some embodiments, the data stored in a memory of the building device and wirelessly transmitted to the mobile device via the NFC circuit includes an access log entry. The log entry includes one of a timestamp, a tag identification number, a configuration parameter, a type of action performed, and a troubleshooting message.

In some embodiments, the data wirelessly received from the mobile device via the NFC circuit, and stored in the memory of the building device includes configuration parameters associated with the building device.

In some embodiments, method further includes transmitting to another device data received by the mobile device from the building device via the NFC circuit.

BRIEF DESCRIPTION OF THE DRAWINGS

FIG. 8 is a flowchart of a process for automatically selecting an operating mode for a HVAC actuator, according to some embodiments.

FIG. 9 is a flowchart of another process for automatically selecting an operating mode for a HVAC actuator, according to some embodiments.

FIGS. 15A-15H are drawings of a graphical user interface provided by an application running on a mobile device for facilitating communications with the building device via NFC, according to some embodiments.

DETAILED DESCRIPTION

Figure 1:
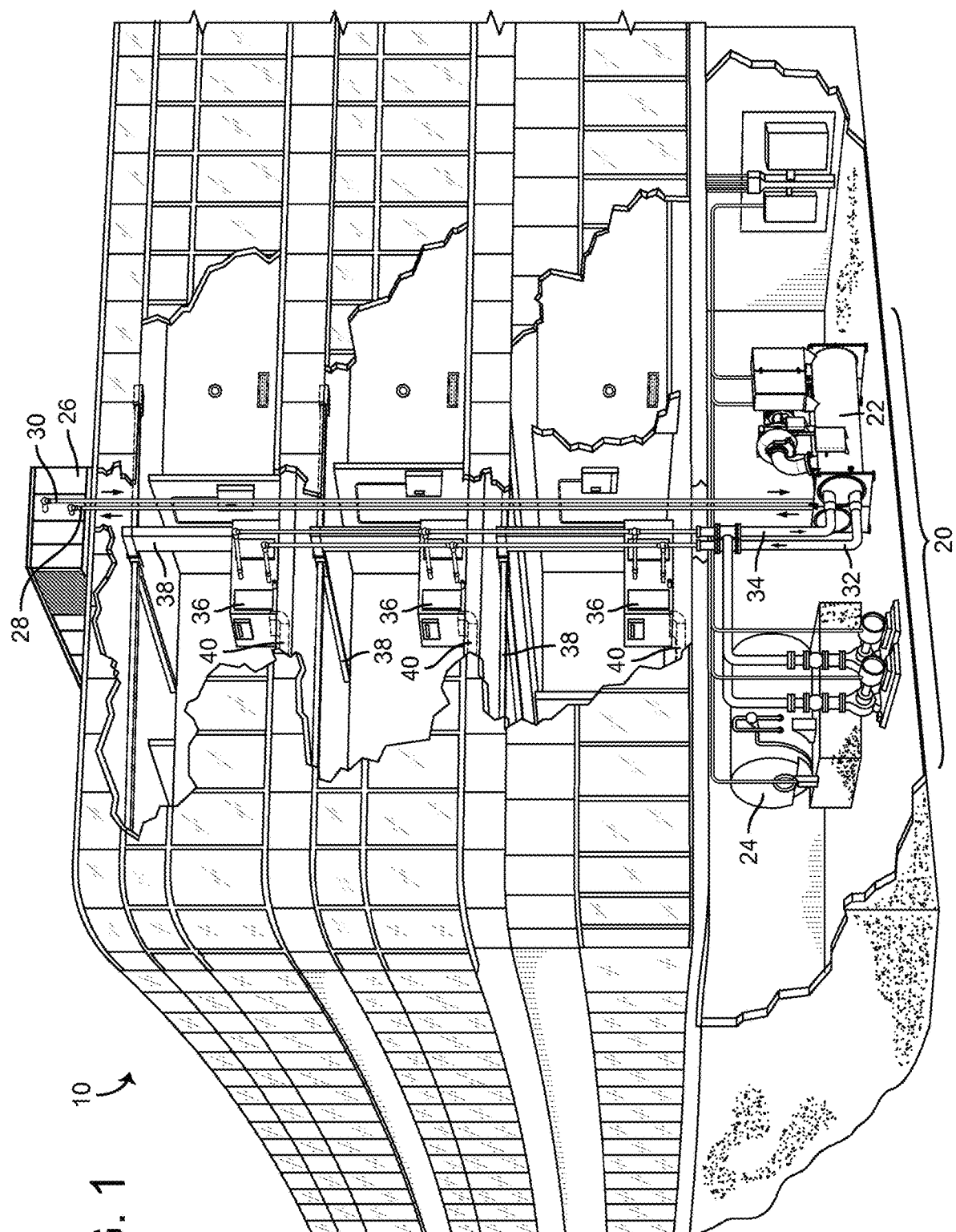
FIG. 1 is a perspective view of a building serviced by a HVAC system, according to some embodiments.

Referring generally to the FIGURES, systems and methods for configuring and communicating with HVAC devices are shown, according to various exemplary embodiments. The systems and methods described herein can be used to automatically select and set an operating mode (e.g., master, slave, normal, etc.) for actuators in a HVAC system. The systems and methods described herein can also be used to wirelessly configure, control, exchange data, or otherwise wirelessly communicate with an actuator in a HVAC system.

Actuators include any apparatus capable of providing forces and/or motion in response to a control signal. Actuators can use any of a variety of force transducers such as rotary motors, linear motors, hydraulic or pneumatic pistons/motors, piezoelectric elements, relays, comb drives, thermal bimorphs, or other similar devices to provide mechanical motion. An actuator can provide any combination of linear, curved, or rotary forces/motion. Some actuators use rotary motors to provide circular motion and/or linear motion (e.g., via a screw drive). Other actuators use linear motors to provide linear motion.

Actuators can include a variety of mechanical components such as gears, pulleys, cams, screws, levers, crankshafts, ratchets, or other components capable of changing or affecting the motion provided by the actuating/transducing element. In some embodiments, actuators do not produce significant motion in operation. For example, some actuators can be operated to exert a force or torque to an external element (e.g., a holding force) without affecting significant linear or rotary motion.

In some implementations, multiple actuators can be interconnected in a tandem arrangement. The actuators can be identical or substantially identical (e.g., the same manufacturer, model, combination of components, etc.). For example, each actuator can have an input data connection, a feedback data connection, and the same or similar internal processing components. Each actuator can be capable of operating in multiple different operating modes (e.g., as a master actuator, as a slave actuator, in a normal operating mode, etc.). The systems and methods of the present disclosure can be used to automatically identify and configure one of the actuators as a master actuator and one or more of the actuators as slave actuators based on the manner in which the actuators are interconnected.

In an exemplary arrangement, the input data connection of a first actuator can be connected (e.g., via a communications bus) to the output of a controller that provides a control signal to the first actuator. The other actuators can be arranged in tandem with the first actuator. For example, the feedback data connection of the first actuator can be connected to the input data connection of a second actuator. In some embodiments, the second actuator can be arranged in parallel with one or more additional actuators. For example, the feedback data connection of the first actuator can be connected with both the input data connection of the second actuator and the input data connections of the one or more additional actuators. In this exemplary arrangement, it would be desirable to identify the first actuator as a master actuator and the other actuators as slave actuators.

Each actuator can be configured to generate a master-slave detection signal (e.g., an analog or digital signal protocol) and to output the master-slave detection signal via its feedback data connection. In some embodiments, the master-slave detection signal is generated and output by an actuator when the actuator first receives power. If the feedback data connection of the actuator is connected with the input data connection of another actuator, the master-slave detection signal will be received at the input data connection of the other actuator.

Each actuator can be configured to monitor its input data connection for the master-slave detection signal. If an actuator detects the master-slave detection signal at its input data connection, the actuator can determine that it is arranged in a slave configuration (i.e., its input data connection is connected with the feedback data connection of another actuator) and can automatically configure itself to operate in a slave operating mode. In response to detecting the master-slave detection signal at its input data connection, the slave actuator can generate and output a reply signal. The slave actuator can output the reply signal via its input data connection.

Each actuator can be configured to monitor its feedback data connection for the reply signal. If an actuator detects the reply signal at its feedback data connection, the actuator can determine that it is arranged in a master configuration (i.e., its feedback data connection is connected with the input data connection of another actuator) and can automatically configure itself to operate in a master operating mode. The master actuator and the slave actuator can engage in bidirectional data communications via a communications bus connecting the feedback data connection of the master actuator with the input data connection of the slave actuator.

In some embodiments, if an actuator does not detect the master-slave detection signal at its input data connection and does not detect the reply signal at its feedback data connection, the actuator can determine that it is not arranged in either a master configuration or a slave configuration (i.e., it is not connected with any other actuators) and can automatically configure itself to operate in a normal operating mode.

Each actuator can have a mode indicator (e.g., a light, a speaker, an electronic display, etc.) to indicate the operating mode in which the actuator is configured. For example, if the mode indicator is a LED, the LED can be illuminated to indicate that the actuator is operating in the master operating mode. The LED can flash, blink, or illuminate a different color to indicate that the actuator is operating in the slave operating mode. The LED can turn off or illuminate yet a different color to indicate that the actuator is operating in the normal operating mode.

In some embodiments, an actuator can be configured to wirelessly communicate with an external device (e.g., a mobile device, a controller, another actuator, etc.) to send and receive various types of data related to the operation of the actuator (e.g., firmware data, control logic, model identification parameters, configuration parameters, diagnostic data, etc.). Advantageously, the actuator can communicate with the external device without requiring any wired power or data connections to the actuator. This allows the actuator to send and receive data in the event that physical access to the actuator is limited. For example, the actuator can be installed in a location that is not readily accessible by a user or service technician.

In some embodiments, the actuator can communicate with external devices while the actuator is still in its packaging at a manufacturer facility or a distributor location. The actuator can be constructed and packaged as a generic actuator and subsequently configured with suitable firmware, software, configuration parameters, or other data specific to a particular actuator model and/or implementation. Operational data such as end of line test data or other diagnostic data can be extracted from the actuator without requiring a physical data connection.

HVAC System and Operating Environment

Referring now to FIG. 1, a perspective view of a building 10 is shown. Building 10 is serviced by a heating, ventilation, and air conditioning system (HVAC) system 20. HVAC system 20 is shown to include a chiller 22, a boiler 24, a rooftop cooling unit 26, and a plurality of air handling units (AHUs) 36. HVAC system 20 uses a fluid circulation system to provide heating and/or cooling for building 10. The circulated fluid can be cooled in chiller 22 or heated in boiler 24, depending on whether cooling or heating is required. Boiler 24 can add heat to the circulated fluid by burning a combustible material (e.g., natural gas). Chiller 22 can place the circulated fluid in a heat exchange relationship with another fluid (e.g., a refrigerant) in a heat exchanger (e.g., an evaporator). The refrigerant removes heat from the circulated fluid during an evaporation process, thereby cooling the circulated fluid.

The circulated fluid from chiller 22 or boiler 24 can be transported to AHUs 36 via piping 32. AHUs 36 can place the circulated fluid in a heat exchange relationship with an airflow passing through AHUs 36. For example, the airflow can be passed over piping in fan coil units or other air conditioning terminal units through which the circulated fluid flows. AHUs 36 can transfer heat between the airflow and the circulated fluid to provide heating or cooling for the airflow. The heated or cooled air can be delivered to building 10 via an air distribution system including air supply ducts 38 and can return to AHUs 36 via air return ducts 40. HVAC system 20 is shown to include a separate AHU 36 on each floor of building 10. In other embodiments, a single AHU (e.g., a rooftop AHU) can supply air for multiple floors or zones. The circulated fluid from AHUs 36 can return chiller 22 or boiler 24 via piping 34.

In some embodiments, the refrigerant in chiller 22 is vaporized upon absorbing heat from the circulated fluid. The vapor refrigerant can be provided to a compressor within chiller 22 where the temperature and pressure of the refrigerant are increased (e.g., using a rotating impeller, a screw compressor, a scroll compressor, a reciprocating compressor, a centrifugal compressor, etc.). The compressed refrigerant can be discharged into a condenser within chiller 22. In some embodiments, water (or another chilled fluid) flows through tubes in the condenser of chiller 22 to absorb heat from the refrigerant vapor, thereby causing the refrigerant to condense. The water flowing through tubes in the condenser can be pumped from chiller 22 to a rooftop cooling unit 26 via piping 28. Cooling unit 26 can use fan driven cooling or fan driven evaporation to remove heat from the water. The cooled water in rooftop unit 26 can be delivered back to chiller 22 via piping 30 and the cycle repeats.

Figure 2:
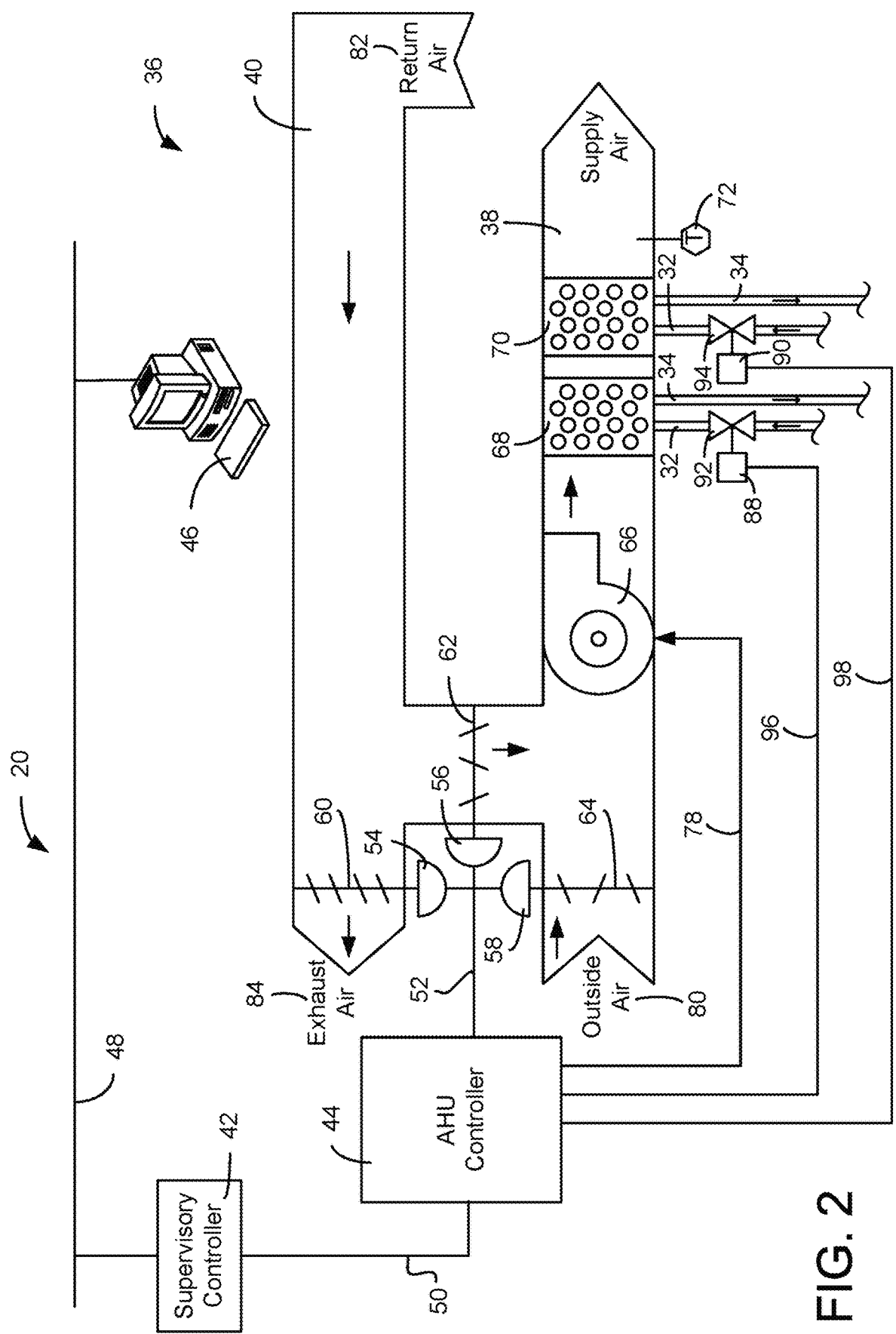
FIG. 2 is a block diagram illustrating a portion of the HVAC system of FIG. 1 in greater detail, according to some embodiments.

Referring now to FIG. 2, a block diagram of a portion of HVAC system 20 is shown, according to some embodiments. In FIG. 2, AHU 36 is shown as an economizer type air handling unit. Economizer type air handling units vary the amount of outside air and return air used by the air handling unit for heating or cooling. For example, AHU 36 can receive return air 82 from building 10 via return air duct 40 and can deliver supply air 86 to building 10 via supply air duct 38. AHU 36 can be configured to operate exhaust air damper 60, mixing damper 62, and outside air damper 64 to control an amount of outside air 80 and return air 82 that combine to form supply air 86. Any return air 82 that does not pass through mixing damper 62 can be exhausted from AHU 36 through exhaust damper 60 as exhaust air 84.

Each of dampers 60-64 can be operated by an actuator. As shown in FIG. 2, exhaust air damper 60 can be operated by actuator 54, mixing damper 62 can be operated by actuator 56, and outside air damper 64 can be operated by actuator 58. Actuators 54-58 can communicate with an AHU controller 44 via a communications link 52. AHU controller 44 can be an economizer controller configured to use one or more control algorithms (e.g., state-based algorithms, extremum seeking control algorithms, PID control algorithms, model predictive control algorithms, etc.) to control actuators 54-58. Actuators 54-58 can receive control signals from AHU controller 44 and can provide feedback signals to AHU controller 44. Feedback signals can include, for example, an indication of a current actuator position, an amount of torque or force exerted by the actuator, diagnostic information (e.g., results of diagnostic tests performed by actuators 54-58), status information, commissioning information, configuration settings, calibration data, and/or other types of information or data that can be collected, stored, or used by actuators 54-58.

Still referring to FIG. 2, AHU 36 is shown to include a cooling coil 68, a heating coil 70, and a fan 66. In some embodiments, cooling coil 68, heating coil 70, and fan 66 are positioned within supply air duct 38. Fan 66 can be configured to force supply air 86 through cooling coil 68 and/or heating coil 70. AHU controller 44 can communicate with fan 66 via communications link 78 to control a flow rate of supply air 86. Cooling coil 68 can receive a chilled fluid from chiller 22 via piping 32 and can return the chilled fluid to chiller 22 via piping 34. Valve 92 can be positioned along piping 32 or piping 34 to control an amount of the chilled fluid provided to cooling coil 68. Heating coil 70 can receive a heated fluid from boiler 24 via piping 32 and can return the heated fluid to boiler 24 via piping 34. Valve 94 can be positioned along piping 32 or piping 34 to control an amount of the heated fluid provided to heating coil 70.

Each of valves 92-94 can be controlled by an actuator. As shown in FIG. 2, valve 92 can be controlled by actuator 88 and valve 94 can be controlled by actuator 90. Actuators 88-90 can communicate with AHU controller 44 via communications links 96-98. Actuators 88-90 can receive control signals from AHU controller 44 and can provide feedback signals to controller 44. In some embodiments, AHU controller 44 receives a measurement of the supply air temperature from a temperature sensor 72 positioned in supply air duct 38 (e.g., downstream of cooling coil 68 and heating coil 70). AHU controller 44 can operate actuators 88-90 to modulate an amount of heating or cooling provided to supply air 86 to achieve a setpoint temperature for supply air 86 or to maintain the temperature of supply air 86 within a setpoint temperature range.

In some embodiments, two or more of actuators 54-58 and/or actuators 88-90 can be arranged in a tandem configuration. For example, one actuator can be arranged as a master actuator (e.g., directly connected with AHU controller 44) and other actuators can be arranged as slave actuators (e.g., connected to a feedback data connection of the master actuator). Such a tandem arrangement is described in greater detail with reference to FIG. 3. Advantageously, each of actuators 54-58 and 88-90 can be configured to automatically determine whether it is arranged as a master actuator, a slave actuator, or not linked to any other actuators. Each of actuators 54-58 and 88-90 can be configured to automatically set its own operating mode (e.g., master, slave, non-linked, etc.) based on the determined arrangement.

Still referring to FIG. 2, HVAC system 20 is shown to include a supervisory controller 42 and a client device 46. Supervisory controller 42 can include one or more computer systems (e.g., servers, BAS controllers, etc.) that serve as enterprise level controllers, application or data servers, head nodes, master controllers, or field controllers for HVAC system 20. Supervisory controller 42 can communicate with multiple downstream building systems or subsystems (e.g., an HVAC system, a security system, etc.) via a communications link 50 according to like or disparate protocols (e.g., LON, BACnet, etc.). In some embodiments, AHU controller 44 receives information (e.g., commands, setpoints, operating boundaries, etc.) from supervisory controller 42. For example, supervisory controller 42 can provide AHU controller 44 with a high fan speed limit and a low fan speed limit. A low limit can avoid frequent component and power taxing fan start-ups while a high limit can avoid operation near the mechanical or thermal limits of the fan system. In various embodiments, AHU controller 44 and supervisory controller 42 can be separate (as shown in FIG. 2) or integrated. In an integrated implementation, AHU controller 44 can be a software module configured for execution by a processor of supervisory controller 42.

Client device 46 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 46 can be a computer workstation, a client terminal, a remote or local interface, or any other type of user interface device. Client device 46 can be a stationary terminal or a mobile device. For example, client device 46 can be a desktop computer, a computer server with a user interface, a laptop computer, a tablet, a smartphone, a PDA, or any other type of mobile or non-mobile device.

Automated Master-Slave Determination and Operating Mode Selection

Figure 3:
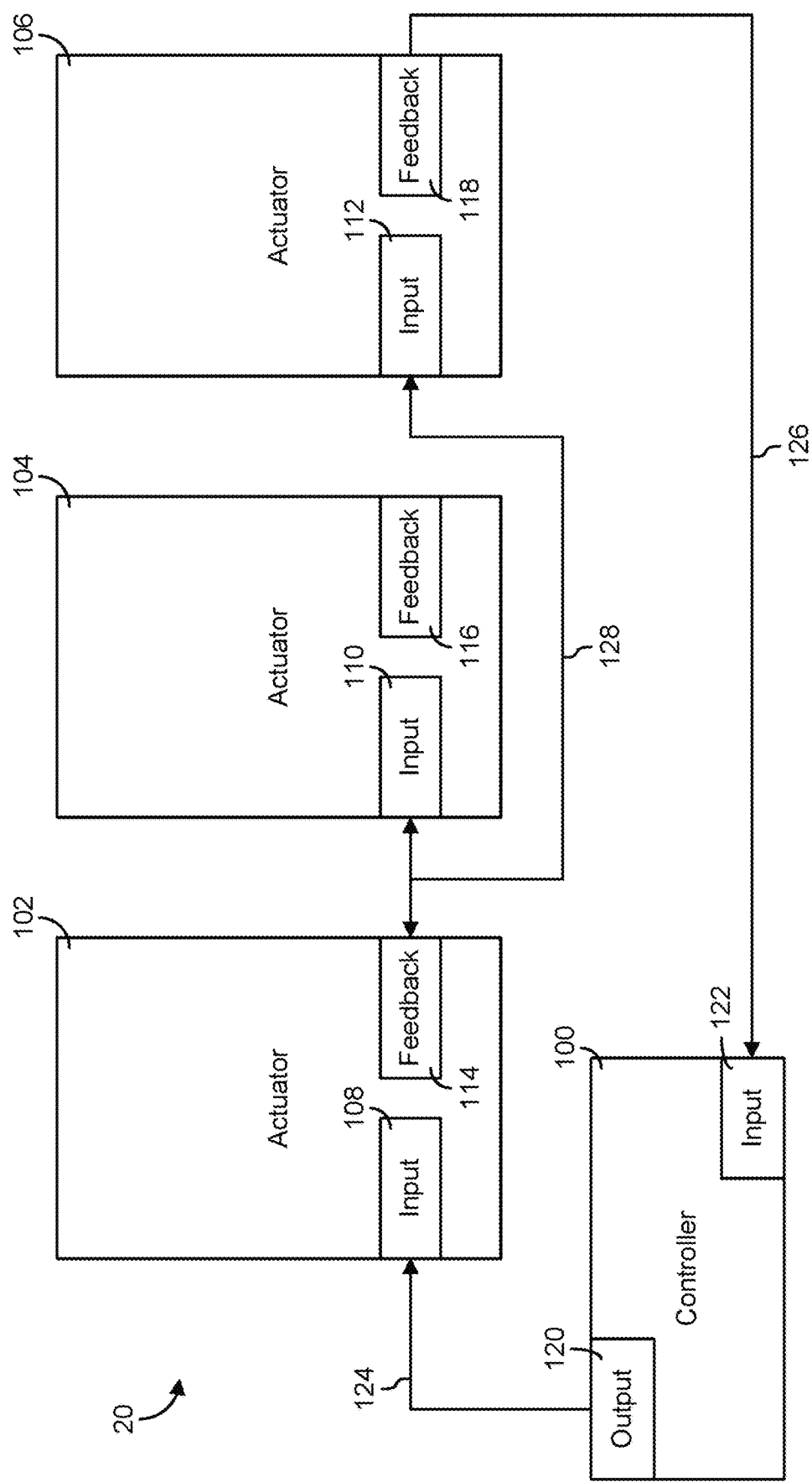
FIG. 3 is a block diagram illustrating multiple actuators of the HVAC system of FIG. 1 arranged in tandem, according to some embodiments.

Referring now to FIG. 3, a block diagram illustrating a portion of HVAC system 20 is shown, according to some embodiments. HVAC system 20 is shown to include a controller 100 and several actuators 102, 104, and 106 in a tandem arrangement. Controller 100 can be an AHU controller (e.g., AHU controller 44), an economizer controller, a supervisory controller (e.g., supervisory controller 42), a zone controller, a field controller, an enterprise level controller, a motor controller, an equipment-level controller (e.g., an actuator controller) or any other type of controller that can be used in HVAC system 20.

Controller 100 is shown to include an output data connection 120 and an input data connection 122. Controller 100 can provide a control signal for actuators 102-106 via output data connection 120. In some embodiments, the control signal provided via output data connection 120 is a voltage signal. Controller 100 can modulate the voltage signal within a voltage range (e.g., 0-10 VDC) to set a rotational position for actuators 102-106. For example, a voltage of 0.0 VDC may correspond to 0 degrees of rotation and a voltage of 10.0 VDC may correspond to 90 degrees of rotation. The control signal can be communicated to actuators 102-106 via a communications bus 124 connected to output data connection 120.

Actuators 102-106 can provide controller 100 with a feedback signal indicating the current rotational position of actuators 102-106. The feedback signal can be a voltage signal similar to the control signal output by controller 100 (e.g., 0-10 VDC) and can be communicated to controller 100 via communications bus 126. Controller 100 can receive the feedback signal at input data connection 122. In some embodiments, the feedback signal includes an amount of torque or force exerted by actuators 102-106, diagnostic information (e.g., results of diagnostic tests performed by actuators 54-58), status information, commissioning information, configuration settings, calibration data, and/or other types of information or data that can be collected, stored, or used by actuators 102-106.

Actuators 102-106 can be any actuators of HVAC system 20. For example, actuators 102-106 can be damper actuators (e.g., actuators 54-58), valve actuators (e.g., actuators 88-90), fan actuators, pump actuators, or any other type of actuators that can be used in HVAC system 20. In various embodiments, actuators 102-106 can be linear proportional actuators (i.e., the rotational position of actuators 102-106 is proportional to the voltage provided by controller 100) or non-linear actuators (i.e., the rotational position of actuators 102-106 varies disproportionately with the voltage provided by controller 100).

In some embodiments, actuators 102-106 are identical or substantially identical (e.g., the same manufacturer, the same model, the same internal components, etc.). For example, each of actuators 102-106 is shown to include an input data connection (i.e., input data connections 108, 110, and 112) and a feedback data connection (i.e., feedback data connections 114, 116, and 118). Actuators 102-106 can have the same or similar internal processing components (e.g., a processing circuit having a processor, memory, and memory modules). Each of actuators 102-106 can be capable of operating in multiple different operating modes. For example, each of actuators 102-106 can be capable of operating as a master actuator, as a slave actuator, or in a normal (e.g., non-linked) operating mode. Advantageously, each of actuators 102-106 can be configured to automatically identify itself as a master actuator, a slave actuator, or a non-linked actuator and can set its own operating mode based on the manner in which it is interconnected with the other actuators.

Still referring to FIG. 3, actuators 102-106 are shown in a tandem arrangement, according to some embodiments. In the exemplary tandem arrangement, input data connection 108 of actuator 102 is connected (e.g., via communications bus 124) to output data connection 120 of controller 100. Feedback data connection 114 of actuator 102 can be connected to input data connection 110 of actuator 104 via communications bus 128. Communications bus 128 can be a wired or wireless communications link and can use any of a variety of disparate communications protocols (e.g., BACnet, LON, WiFi, Bluetooth, NFC, TCP/IP, etc.). Actuator 104 can be arranged in parallel with actuator 106. For example, feedback data connection 114 of actuator 102 can be connected with both input data connection 110 of actuator 104 and input data connection 112 of actuator 106 via communications bus 128.

As shown in FIG. 3, actuator 102 is arranged as a master actuator and actuators 104-106 are arranged as slave actuators. A master actuator can be defined as an actuator having an input data connection that is connected to the output data connection of a controller. The feedback data connection of a master actuator can be connected with the input data connections of one or more slave actuators. A slave actuator can be defined as an actuator having an input data connection that is connected to the feedback data connection of a master actuator. The feedback data connection of a slave actuator can be connected to the input data connection of the controller or may not be connected with anything.

Figure 4:
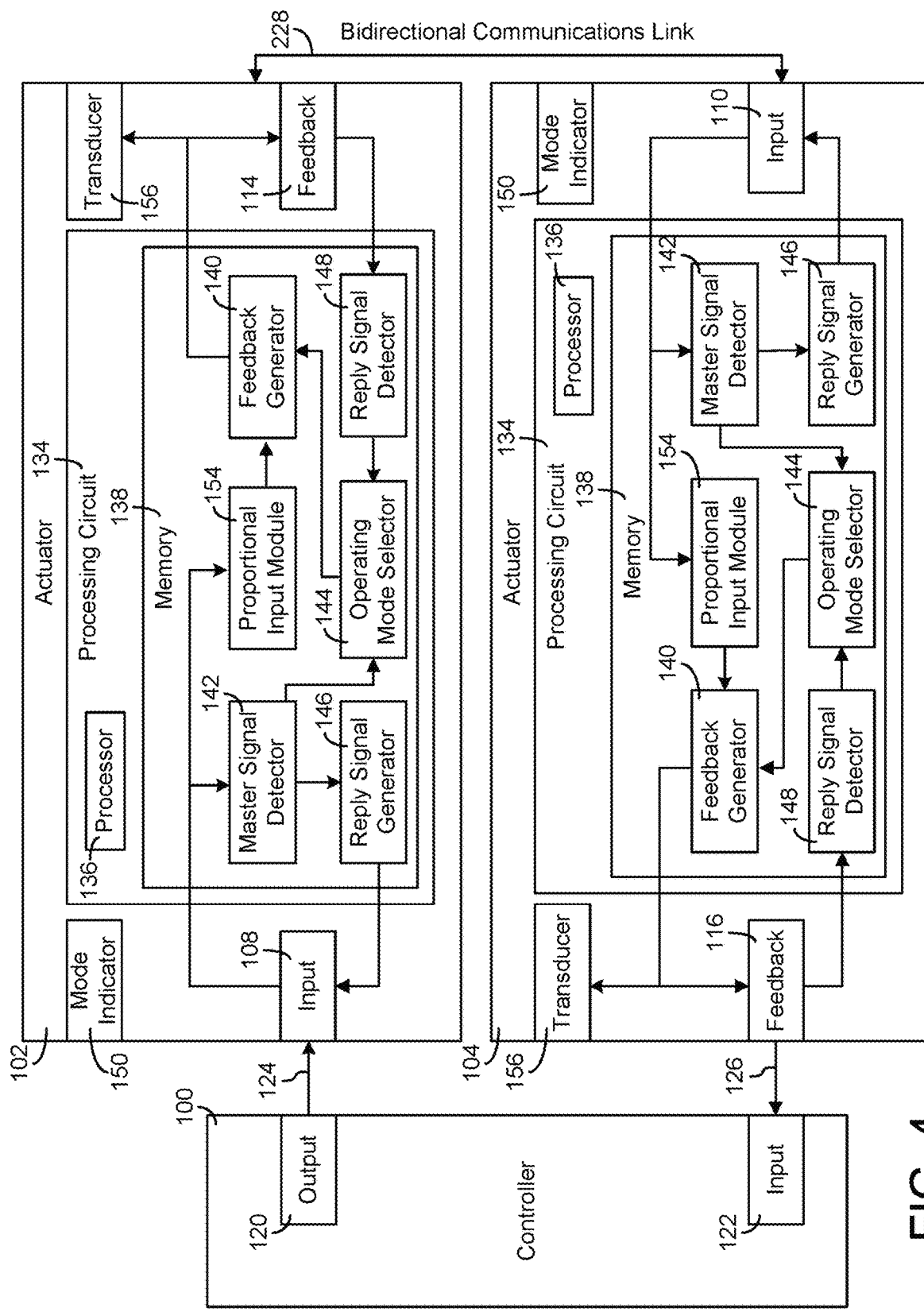
FIG. 4 is a block diagram illustrating the actuators of FIG. 3 in greater detail, according to some embodiments.

Referring now to FIG. 4, a block diagram illustrating actuators 102 and 104 in greater detail is shown, according to some embodiments. FIG. 4 illustrates another tandem configuration in which actuator 102 is arranged as a master actuator and actuator 104 is arranged as a slave actuator. In FIG. 4, output data connection 120 of controller 100 is connected with input data connection 108 of actuator 102 via communications bus 124. Feedback data connection 114 of actuator 102 can be connected with input data connection 110 of actuator 104 via a bidirectional communications link 228. Bidirectional communications link 228 can be implemented as a communications bus (e.g., communications bus 128), a wired communications interface, or a wireless communications interface. Bidirectional communications link 228 and can utilize any of a variety of disparate communications protocols (e.g., BACnet, LON, TCP/IP, Bluetooth, NFC, WiFi, etc.). Feedback data connection 116 of actuator 104 can be connected with input data connection 122 of controller 100 via communications bus 126.

Actuators 102 and 104 can be identical or substantially identical and can include the same or similar internal processing components. For example, each of actuators 102-104 is shown to include a processing circuit 134 including a processor 136 and memory 138. Processor 136 can be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

The term "corresponding actuator" is used throughout this description to specify a particular actuator with respect to a given component. The corresponding actuator for any given component is the actuator that includes the component. For example, the corresponding actuator for all of the components of actuator 102 is actuator 102, whereas the corresponding actuator for all of the components of actuator 104 is actuator 104. The same reference numbers are used for many of the components of each actuator to indicate that each actuator can be identical or substantially identical. Advantageously, each processing circuit 134 can be configured to automatically determine whether the corresponding actuator is arranged as a master actuator, a slave actuator, or in a non-linked arrangement notwithstanding the identical or substantially identical components of each actuator. Processing circuit 134 can select an operating mode for the corresponding actuator based on a result of the determination.

Memory 138 can include one or more devices (e.g., memory units, memory devices, storage devices, etc.) for storing data and/or computer code for completing and/or facilitating the various processes described in the present disclosure. Memory 138 can include random access memory (RAM), read-only memory (ROM), hard drive storage, temporary storage, non-volatile memory, flash memory, optical memory, or any other suitable memory for storing software objects and/or computer instructions. Memory 138 can include database components, object code components, script components, or any other type of information structure for supporting the various activities and information structures described in the present disclosure. Memory 138 can be communicably connected to processor 136 via processing circuit 134 and can include computer code for executing (e.g., by processor 136) one or more processes described herein.

Still referring to FIG. 4, memory 138 is shown to include a feedback generator 140. Each feedback generator 140 can be configured to generate a master-slave detection signal (e.g., a series of digital pulses, an analog signal, etc.) and to output the master-slave detection signal via the feedback data connection of the corresponding actuator (e.g., feedback data connection 114 or 116). In some embodiments, feedback generator 140 generates and outputs the master-slave detection signal when the corresponding actuator first receives power. In some embodiments, feedback generator 140 generates and outputs the master-slave detection signal when the corresponding actuator enters a calibration mode. An actuator can enter the calibration mode, for example, in response to a signal from another component of HVAC system 20 (e.g., a controller, a client device, another actuator, etc.) and/or in response to a user-operable switch of the actuator being moved into a calibration position.

The master-slave detection signal output at feedback data connection 114 of actuator 102 can be received at input data connection 110 of actuator 104 since feedback data connection 114 is connected with input data connection 110 via bidirectional communications link 228. However, the master-slave detection signal output at feedback data connection 116 may not be received at input data connection 108 since no direct connection exists between feedback data connection 116 and input data connection 108. This distinction can be used to identify actuator 102 as a master actuator and to identify actuator 104 as a slave actuator, as described in greater detail below.

Still referring to FIG. 4, memory 138 is shown to include a master signal detector 142. Master signal detector 142 can be configured to monitor the input data connection of the corresponding actuator for the master-slave detection signal. In the arrangement shown in FIG. 4, the master signal detector 142 of actuator 104 can detect the master-slave detection signal because input data connection 110 is connected with the feedback data connection of another actuator (i.e., feedback data connection 114). However, the master signal detector 142 of actuator 102 may not detect the master-slave detection signal because input data connection 108 is not directly connected with the feedback data connection of any other actuator. In response to detecting the master-slave detection signal, master signal detector 142 can generate a notification for operating mode selector 144 and/or reply signal generator 146. The notification can be an analog or digital signal indicating that the master-slave detection signal has been detected at the input data connection of the corresponding actuator.

Operating mode selector 144 can be configured to select an operating mode for the corresponding actuator. If operating mode selector 144 receives an input indicating that the master-slave detection signal has been detected at the input data connection of the corresponding actuator, operating mode selector 144 can determine that the actuator is arranged in a slave configuration and can select a slave operating mode for the actuator.

Reply signal generator 146 can be configured to generate and output a reply signal. The reply signal can be a series of digital pulses, an analog signal, or any other type of data signal. In some embodiments, reply signal generator 146 generates and outputs the reply signal in response to a determination (e.g., by operating mode selector 144) that the actuator is arranged in a slave configuration and/or in response to a selection of the slave operating mode. In some embodiments, reply signal generator 146 generates and outputs the reply signal in response to receiving an input (e.g., from master signal detector 142) indicating that the master-slave detection signal has been detected at the input data connection of the corresponding actuator.

In the arrangement shown in FIG. 4, the reply signal generator 146 of actuator 104 can generate and output a reply signal because the master-slave detection signal is received and detected at input data connection 110. However, the reply signal generator 146 of actuator 102 may not generate or output a reply signal because the master-slave detection signal is not received or detected at input data connection 108.

Reply signal generator 146 can output the reply signal via the input data connection of the corresponding actuator. The reply signal can be communicated from the input data connection back to the feedback data connection of the actuator from which the master-slave detection signal was received. For example, the reply signal generated by the reply signal generator 146 of actuator 104 can be output via data connection 110 and communicated back to feedback data connection 114 via bidirectional communications link 228. Actuators 102-104 can engage in bidirectional data communications via bidirectional communications link 228. For example, actuator 102 can send the master-slave detection signal via bidirectional communications link 228 and can receive the reply signal from actuator 104 via bidirectional communications link 228.

Still referring to FIG. 4, memory 138 is shown to include a reply signal detector 148. Reply signal detector 148 can be configured to monitor the feedback data connection of the corresponding actuator for the reply signal. In the arrangement shown in FIG. 4, the reply signal detector 148 of actuator 102 can detect the reply signal that is generated by the reply signal generator in actuator 104 and communicated back to feedback data connection 114 of actuator 102. However, the reply signal detector 148 of actuator 104 may not detect the reply signal because feedback data connection 116 does not receive the reply signal.

In response to detecting the reply signal, reply signal detector 148 can generate a notification for operating mode selector 144. The notification can be an analog or digital signal indicating that the reply signal has been received at the feedback data connection of the corresponding actuator. If operating mode selector 144 receives an input indicating that the reply signal has been received at the feedback data connection of the corresponding actuator, operating mode selector 144 can determine that the actuator is arranged in a master configuration and can select a master operating mode for the actuator.

In some embodiments, if an actuator does not detect the master-slave detection signal at its input data connection and does not detect the reply signal at its feedback data connection, operating mode selector 144 can determine that the actuator is not arranged in neither the master configuration nor the slave configuration. For example, the actuator may not be connected with any other actuators. In response to a determination that the actuator is arranged in neither the master configuration nor the slave configuration, operating mode selector 144 can select a normal (e.g., non-linked) operating mode.

Actuators 102-104 can behave differently based on whether operating mode selector 144 selects the master operating mode, the slave operating mode, or the normal operating mode. For example, in the master operating mode, an actuator can accept an input signal of any value within an input signal range (e.g., 0-10 VDC) and can produce a feedback signal at one or more discrete values (e.g., 0 VDC, 5 VDC, 10 VDC, etc.). In the slave operating mode, an actuator can accept an input signal at one or more discrete values (e.g., 0 VDC, 5 VDC, 10 VDC, etc.) and can produce a feedback signal of any value within a feedback signal range (e.g., 0-10 VDC). In the normal operating mode, an actuator can accept an input signal of any value within an input signal range (e.g., 0-10 VDC) and can produce a feedback signal of any value within a feedback signal range (e.g., 0-10 VDC).

Still referring to FIG. 4, memory 138 is shown to include a proportional input module 154. Proportional input module 154 can be configured to translate a control signal received from controller 100 into an amount of rotation, linear motion, force, torque, or other physical output provided by transducer 156. For example, proportional input module 154 can translate an input voltage of 0.0 VDC to 0 degrees of rotation and can translate an input voltage of 10.0 VDC to 90 degrees of rotation. The output rotation can be provided to transducer 156 directly from proportional input module 154 or indirectly (e.g., via feedback generator 140). Feedback generator 140 can include one or more filters (e.g., low pass filters), gain stages, and/or buffers applied to the output rotation before the output rotation is communicated as a feedback signal to controller 100. Controller 100 can use the feedback signal to determine the current rotational position of a motor, valve, or damper controlled by the actuator.

In some embodiments, actuators 102-106 include a mode indicator 150. Mode indicator 150 can be a light, a speaker, an electronic display, or other component configured to indicate the operating mode selected by operating mode selector 144. For example, mode indicator 150 can be a LED and can be illuminated to indicate that the actuator is operating in the master operating mode. The LED can flash, blink, or illuminate a different color to indicate that the actuator is operating in the slave operating mode. The LED can turn off or illuminate yet a different color to indicate that the actuator is operating in the normal operating mode.

Figure 5:
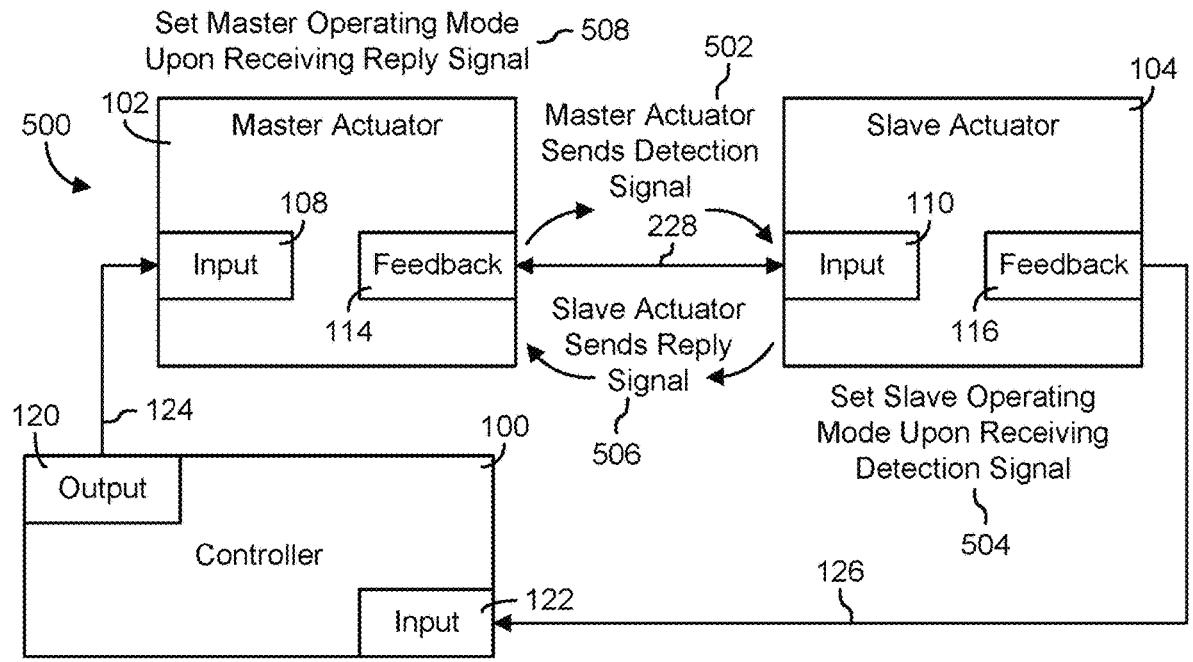
FIG. 5 is a block diagram illustrating a first process for automatically detecting an actuator arrangement and setting an actuator operating mode in which a master actuator initiates the process, according to some embodiments.
Figure 6:
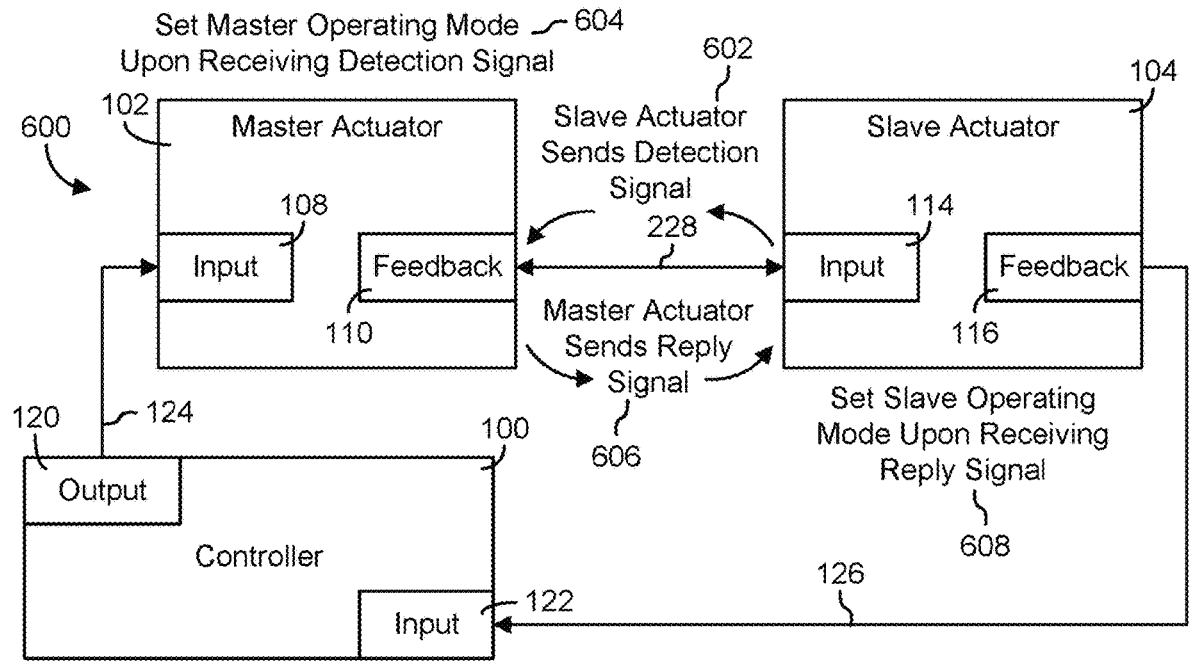
FIG. 6 is a block diagram illustrating a second process for automatically detecting an actuator arrangement and setting an actuator operating mode in which a slave actuator initiates the process, according to some embodiments.

Referring now to FIGS. 5-6, a pair of block diagrams illustrating two processes 500 and 600 are shown, according to some embodiments. Processes 500 and 600 can be performed by one or more actuators of a HVAC system to automatically identify an arrangement of the actuators and to automatically select an operating mode. In both processes 500 and 600, a bidirectional communications link 228 is formed between a master actuator 102 and a slave actuator 104. Bidirectional communications link 228 connects the feedback data connection 114 of master actuator 102 with the input data connection 110 of slave actuator 104. Bidirectional communications link 228 can be used to exchange various types of data between actuators 102 and 104. For example, bidirectional communications link 228 can be used to communicate a master-slave detection signal, a reply signal, diagnostic information, status information, configuration settings, calibration data, or other types of information or data that can be collected, stored, or used by actuators 102-104.

Referring specifically to FIG. 5, process 500 is shown to include master actuator 102 sending a detection signal to slave actuator 104 via bidirectional communications link 228 (step 502). Actuators 102 and 104 can be identical or substantially identical and can be distinguished only by the manner in which actuators 102-104 are interconnected. Either actuator can be capable of functioning as a master actuator or a slave actuator. At the time the detection signal is communicated, it can be unknown whether each of actuators 102-104 is arranged as a master actuator or a slave actuator.

Master actuator 102 can generate the detection signal according to stored criteria and can output the detection signal via feedback data connection 114. The detection signal can be a series of digital pulses, an analog signal, or any other type of data signal. Slave actuator 104 can monitor input data connection 110 for the detection signal. Slave actuator 104 can identify the detection signal by comparing the signals received at input data connection 110 with a stored representation of the detection signal.

In response to receiving the detection signal at input data connection 110, slave actuator 104 can set its operating mode to a slave operating mode (step 504) and can send a reply signal back to master actuator 102 via bidirectional communications link 228 (step 506). Slave actuator 104 can generate the reply signal according to stored criteria and can output the reply signal via input data connection 110. The reply signal can be a series of digital pulses, an analog signal, or any other type of data signal.

Master actuator 102 can monitor feedback data connection 114 for the reply signal. Master actuator 102 can identify the reply signal by comparing the signals received at feedback data connection 114 with a stored representation of the reply signal. In response to receiving the reply signal at feedback data connection 114, master actuator 102 can set its operating mode to a master operating mode (step 508).

In process 500, master actuator 102 initiates the master-slave identification process by sending the detection signal to slave actuator 104. Slave actuator 104 then responds with the reply signal. In other embodiments, slave actuator 104 can initiate the process and master actuator 102 can respond with the reply signal. Such an alternative process is illustrated in FIG. 6.

Referring specifically to FIG. 6, process 600 is shown to include slave actuator 104 sending a detection signal to master actuator 102 via bidirectional communications link 228 (step 602). Slave actuator 104 can generate the detection signal according to stored criteria and can output the detection signal via input data connection 110. Master actuator 102 can monitor feedback data connection 114 for the detection signal. Master actuator 102 can identify the detection signal by comparing the signals received at feedback data connection 114 with a stored representation of the detection signal.

In response to receiving the detection signal at feedback data connection 114, master actuator 102 can set its operating mode to a master operating mode (step 604) and can send a reply signal back to slave actuator 104 via bidirectional communications link 228 (step 606). Master actuator 102 can generate the reply signal according to stored criteria and can output the reply signal via feedback data connection 114.

Slave actuator 104 can monitor input data connection 110 for the reply signal. Slave actuator 104 can identify the reply signal by comparing the signals received at input data connection 110 with a stored representation of the reply signal. In response to receiving the reply signal at input data connection 110, slave actuator 104 can set its operating mode to a slave operating mode (step 608).

Figure 7A:
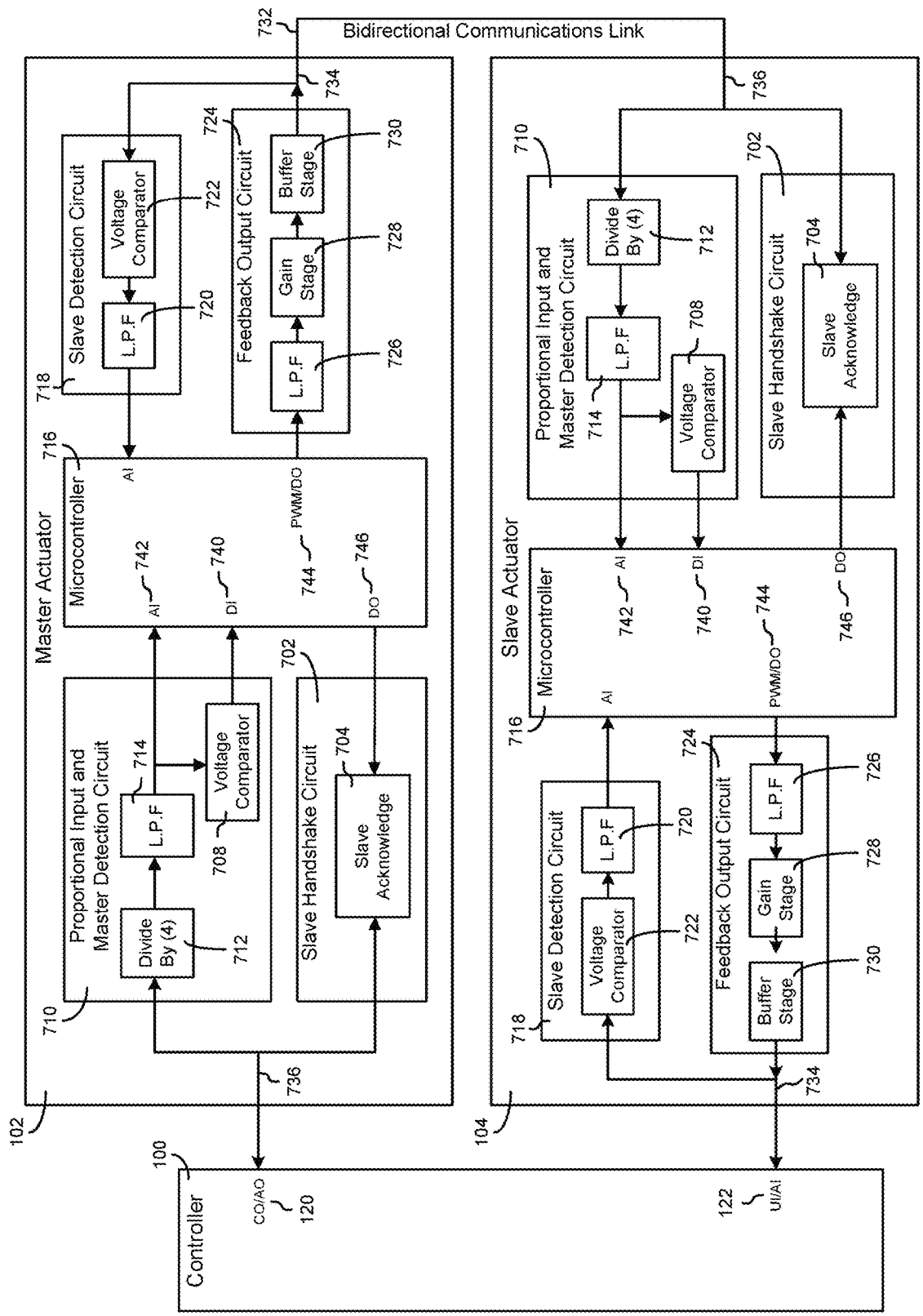
FIG. 7A is a block diagram illustrating the master actuator and slave actuator of FIGS. 3-5 in greater detail, according to some embodiments.

Referring now to FIG. 7A, a block diagram illustrating master actuator 102 and slave actuator 104 in greater detail is shown, according to some embodiments. Actuators 102 and 104 can be identical or substantially identical and can include the same or similar components. For example, each of actuators 102 and 104 is shown to include an input connection 736, a feedback connection 734, a slave handshake circuit 702, a proportional input and master detection circuit 710, a microcontroller 716, a slave detection circuit 718, and a feedback output circuit 724.

The input connection 736 of master actuator 102 can be connected with output data connection 120 of controller 100. Feedback connection 734 of master actuator 102 can be connected via a bidirectional communications link 732 with input connection 736 of slave actuator 104. Feedback connection 734 of slave actuator 104 can be connected with input connection 122 of controller 100.

Proportional input and master detection circuit 710 can be configured to perform the functions of proportional input module 154 and master signal detector 142, as described with reference to FIG. 4. For example, proportional input and master detection circuit 710 is shown to include a division module 712, a low pass filter 714, and a voltage comparator 708. Division module 712 can apply a division factor to the input signal received at input connection 736. Division module 712 can provide the divided signal to low pass filter 714. Low pass filter 714 can filter the divided signal from division module 712 and can provide the filtered signal as an analog input 742 to voltage comparator 708 and microcontroller 716. Voltage comparator 708 can be configured to monitor the output of low pass filter 714 for the master detection signal. The master detection signal can be received from a master actuator if input connection 736 is connected with the feedback connection of another actuator. Voltage comparator 708 can provide an analog or digital input 740 to microcontroller 716 indicating whether the master detection signal is received at input connection 736.

Microcontroller 716 can be configured to generate the master detection signal and to provide the master detection signal as an output via feedback connection 734. In some embodiments, microcontroller 716 generates the master detection signal according to a signal protocol. In some embodiments, the master detection signal is a series of voltage pulses. Microcontroller 716 can output the master detection signal via PWM/DO output 744. PWM/DO output 744 can communicate the master detection signal to feedback connection 734 via feedback output circuit 724.

Feedback output circuit 724 is shown to include a low pass filter 726, a gain stage 728, and a buffer stage 730. Low pass filter 726 can filter the output signal from PWM/DO output 744 of microcontroller 716. Gain stage 728 can multiply the filtered signal from low pass filter 726 by a multiplication factor and provide the multiplied signal to buffer stage 730. Buffer stage 730 can output the signal from gain stage 728 as a feedback signal via feedback connection 734.

Still referring to FIG. 7A, microcontroller 716 can be configured to receive an analog or digital input 740 indicating whether the master detection signal has been received at input connection 736. If input 740 indicates that the master detection signal has been received, microcontroller 716 can generate a reply signal and provide the reply signal as an analog or digital output 746 to input connection 736. In other embodiments, microcontroller 716 causes slave handshake circuit 702 to generate the reply signal. For example, microcontroller 716 can provide a command to slave acknowledge circuit 704 via output 746 and slave acknowledge circuit 704 can generate the reply signal in response to receiving the command from microcontroller 716. If input 740 indicates that the master detection signal has been received, microcontroller 716 can instruct slave acknowledge circuit 704 to generate the reply signal. The reply signal can be communicated through bidirectional communications link 732 to the other controller (i.e., back to the master controller).

Microcontroller 716 can be configured to set an operating mode for the corresponding actuator. For example, if digital input 740 indicates that the master detection signal has been received, microcontroller 716 can set the corresponding actuator to operate in the slave operating mode. Microcontroller 716 can be configured to receive analog input 748 and to determine whether analog input 748 matches the reply signal. If analog input 748 matches the reply signal, microcontroller 716 can set the corresponding actuator to operate in the master operating mode. If microcontroller 716 does not observe either the master detection signal or the reply signal as an input, microcontroller 716 can set the corresponding actuator to operate in a normal (i.e., non-linked) operating mode.

Slave detection circuit 718 can be configured to perform the functions of reply signal detector 148, as described with reference to FIG. 4. For example, slave detection circuit 718 can monitor feedback connection 734 for the reply signal received via the bidirectional communications link 732. Slave detection circuit 718 is shown to include a voltage comparator 722 and a low pass filter 720. Voltage comparator 722 can determine whether the signal received via bidirectional communications link 732 matches the reply signal and can provide a reply detection signal to low pass filter 720 when the reply signal is detected. Low pass filter 720 can filter the reply detection signal from voltage comparator 722 and can provide the filtered signal as an analog input 748 to microcontroller 716.

Figure 7B:
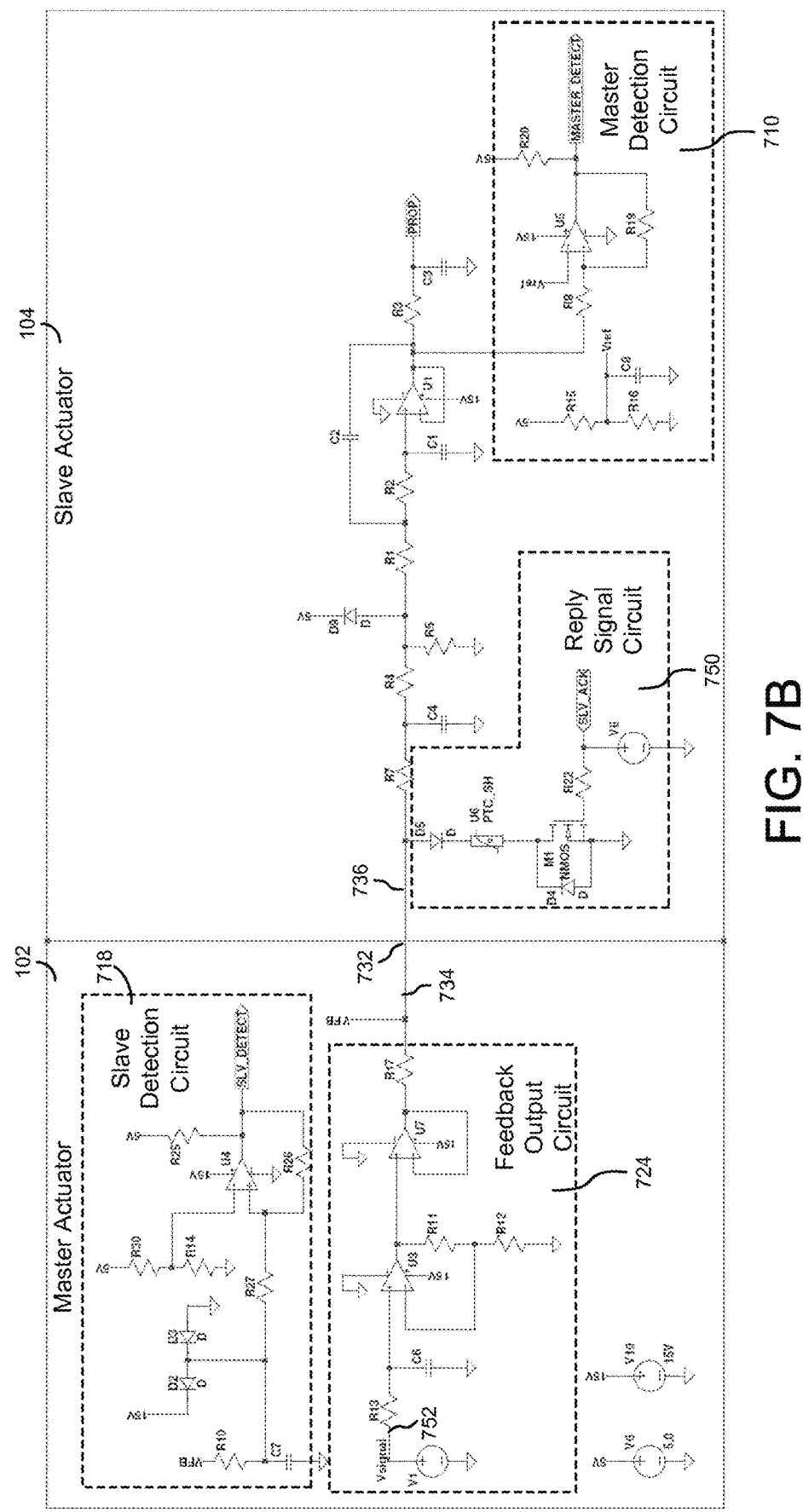
FIG. 7B is a circuit diagram illustrating selected portions of the master actuator and the slave of FIG. 7A, according to some embodiments.

Referring now to FIG. 7B, a circuit diagram illustrating selected portions of master actuator 102 and slave actuator 104 in greater detail is shown, according to some embodiments. Master actuator 102 is shown to include a feedback output circuit 724. Feedback output circuit 724 can include a voltage source $V_1$ configured to generate a voltage signal $V_{signal}$ at wire 752. $V_{signal}$ can be a series of digital pulses within a predetermined voltage range (e.g., 0-10 VDC). For example, $V_{signal}$ can include a series of three 1 Hz pulses from 0-10 VDC followed by a 10 VDC signal. In some embodiments, $V_{signal}$ is a pulse width modulated signal. For example, feedback output circuit 724 can generate $V_{signal}$ by applying a 100% duty cycle and a 0% duty cycle to the voltage source $V_1$.

Feedback output circuit 724 can transform $V_{signal}$ into a feedback voltage signal $V_{fb}$ and output the feedback voltage signal $V_{fb}$ at feedback connection 734. Feedback output circuit 724 is shown to include a non-inverting amplifier consisting of op amp $U_3$, resistor $R_{11}$, and resistor $R_{12}$. Op amp $U_3$ receives an input voltage $V_{in,3}$ at its non-inverting input and produces an output voltage $V_{out,3}$ at its output terminal. In some embodiments, the input voltage $V_{in,3}$ is $V_{signal}$ or a fraction of $V_{signal}$. In some embodiments, the output voltage $V_{out,3}$ is defined by the formula $$V_{out,3} = V_{in,3}\left(1 + \frac{R_{11}}{R_{12}}\right).$$

The output voltage $V_{out,3}$ is provided as an input to the positive terminal of op amp $U_7$. Op amp $U_7$ is arranged in a voltage follower configuration such that the output voltage $V_{out,7}$ of op amp $U_7$ is the same as the input voltage $V_{out,3}$. In some embodiments, capacitor $C_6$ causes feedback output circuit 724 to store energy such that $V_{fb}$ asymptotically increases to the value of $V_{signal}$ when a 100% duty cycle is applied (e.g., when $V_{signal}$ is 10 VDC) and asymptotically decreases to zero when a 0% duty cycle is applied (e.g., when $V_{signal}$ is 0 VDC).

Feedback connection 734 of master actuator 102 can be connected via bidirectional communications link 732 with input connection 736 of slave actuator 104. Slave actuator 104 can receive the feedback voltage signal $V_{fb}$ at input connection 736. Slave actuator 104 can pass the feedback voltage signal $V_{fb}$ through a series of resistors $R_7$, $R_4$, $R_1$, and $R_2$ and an op amp $U_1$. In some embodiments, resistors $R_7$, $R_4$, $R_1$, and $R_2$ function as voltage dividers such that the input voltage $V_{in,1}$ to op amp $U_1$ is a fraction of the feedback voltage signal $V_{fb}$. Op amp $U_1$ is arranged in a voltage follower configuration such that the output voltage $V_{out,1}$ of op amp $U_1$ is the same as the input voltage $V_{in,1}$.

Slave actuator 104 is shown to include a master detection circuit 710. Master detection circuit 710 receives the output signal $V_{out,1}$ from op amp $U_1$. Master detection circuit 710 is shown to include a resistor $R_9$, a resistor $R_{19}$, and an op amp $U_5$. These components of master detection circuit 710 form a comparator with hysteresis (i.e., a non-inverting Schmitt trigger). In this configuration, the input voltage $V_{out,1}$ is applied through the resistor $R_9$ to the non-inverting input of op amp $U_5$ and a reference voltage Vref is applied to the inverting input of op amp $U_5$. The output voltage $V_{out,5}$ of op amp $U_5$ will switch to a high voltage $V_{high}$ (e.g., 5 VDC) when the input voltage $V_{out,1}$ exceeds a high switching threshold $V_{thresh,high}$ and will switch to a low voltage $V_{low}$ (e.g., 0 VDC) when the input voltage $V_{out,1}$ drops below a low switching threshold $V_{thresh,low}$. In some embodiments, the high switching threshold $V_{thresh,high}$ is defined by the equation $$V_{thresh,high} = V_{ref} + \frac{R_9}{R_{19}}V_{sat}$$

and the low switching threshold $V_{thresh,low}$ is defined by the equation $$V_{thresh,high} = V_{ref} + \frac{R_9}{R_{19}}V_{sat},$$

where $V_{sat}$ is the maximum output voltage (e.g., 15 VDC).

The output voltage $V_{out,5}$ of op amp $U_5$ can be provided to microcontroller 716 as the master detection signal $V_{master\_detect}$. The master detection signal $V_{master\_detect}$ will switch to the low voltage $V_{low}$ shortly after the 0% duty cycle is applied to $V_{signal}$ and will switch to the high voltage $V_{high}$ shortly after the 100% duty cycle is applied to $V_{signal}$. Accordingly, the master detection signal $V_{master\_detect}$ can experience a series of digital pulses that are triggered by the series of pulses in $V_{signal}$.

Microcontroller 716 can analyze the master detection signal $V_{master\_detect}$ to determine whether master detection signal $V_{master\_detect}$ matches a stored master detection signal. For example, microcontroller 716 can monitor the master detection signal $V_{master\_detect}$ for a series of digital pulses. In response to a determination that the master detection signal $V_{master\_detect}$ matches the stored master detection signal, microcontroller 716 can set the operating mode of slave actuator 104 to a slave operating mode.

Slave actuator 104 is shown to include a reply signal circuit 750. Reply signal circuit 750 can receive a reply signal $V_{slv\_ack}$ (e.g., 5 VDC) from microcontroller 716 in response to microcontroller 716 determining that the master detection signal $V_{master\_detect}$ matches the stored master detection signal. The reply signal $V_{slv\_ack}$ can be provided through resistor $R_{22}$ to the gate of transistor $M_1$, which can be implemented as a NMOS transistor. When the reply signal $V_{slv\_ack}$ is provided to transistor $M_1$, current can flow from input connection 736, through diode $D_5$ and transistor $M_1$ (downward in FIG. 7B), to ground. The current flow through transistor $M_1$ causes the feedback voltage $V_{fb}$ to drop below a threshold voltage (e.g., 1 VDC) for the duration that the reply signal reply signal $V_{slv\_ack}$ is applied (e.g., 0.5 seconds).

Master actuator 102 is shown to include a slave detection circuit 718. Slave detection circuit can receive the feedback signal $V_{fb}$ from feedback connection 734 via resistor $R_{10}$. Slave detection circuit 718 is shown to include a resistor $R_{27}$, a resistor $R_{26}$, and an op amp $U_4$. These components of slave detection circuit 718 form a comparator with hysteresis (i.e., a non-inverting Schmitt trigger). In this configuration, the feedback signal $V_{fb}$ is applied through the resistor $R_{27}$ to the non-inverting input of op amp $U_4$ and a reference voltage $V_{ref}$ (e.g., 0-5 VDC) is applied to the inverting input of op amp $U_4$. The output voltage $V_{out,4}$ of op amp $U_4$ will switch to a high voltage $V_{high}$ (e.g., 5 VDC) when the feedback signal $V_{fb}$ exceeds a high switching threshold $V_{thresh,high}$ and will switch to a low voltage $V_{low}$ (e.g., 0 VDC) when the feedback signal $V_{fb}$ drops below a low switching threshold $V_{thresh,low}$. In some embodiments, the high switching threshold $V_{thresh,high}$ is defined by the equation $$V_{thresh,high} = V_{ref} + \frac{R_{27}}{R_{26}} V_{sat}$$

and the low switching threshold $V_{thresh,low}$ is defined by the equation $$V_{thresh,high} = V_{ref} - \frac{R_{27}}{R_{26}} V_{sat},$$

where $V_{sat}$ is the maximum output voltage (e.g., 15 VDC).

The output voltage $V_{out,4}$ of op amp $U_4$ can be provided to microcontroller 716 as the slave detection signal $V_{slv\_detect}$. The slave detection signal $V_{slv\_detect}$ will switch to the low voltage $V_{low}$ when the reply signal $V_{slv\_ack}$ is provided to transistor $M_1$. Accordingly, the slave detection signal $V_{slv\_detect}$ can drop to a value of 0 VDC for the duration that the reply signal $V_{slv\_ack}$ is provided by reply circuit 750 (e.g., 0.5 seconds).

Microcontroller 716 can analyze the slave detection signal $V_{slv\_detect}$ to determine whether the slave detection signal $V_{slv\_detect}$ matches a stored slave detection signal. In response to a determination that the slave detection signal $V_{slv\_detect}$ matches the stored slave detection signal, microcontroller 716 can set the operating mode of master actuator 102 to a master operating mode.

Referring now to FIG. 8, a flowchart of a process 800 for automatically selecting an operating mode for a HVAC actuator is shown, according to some embodiments. Process 800 can be performed by any actuator in a HVAC system (e.g., damper actuators 54-58, valve actuators 88-90, fan actuators, pump actuators, etc.). In some embodiments, process 800 is performed by a processing circuit of a HVAC actuator. For example, process 800 can be performed by processing circuit 134 or by microcontroller 716 of one or more of actuators 102-106, as described with reference to FIGS. 4-7.

Process 800 is shown to include transmitting a first data signal via a bidirectional communications link between a first actuator and a second actuator (step 802). The first data signal can be a master-slave detection signal or a reply signal. If the first data signal is a master-slave detection signal, the first data signal can be transmitted upon the actuator receiving power. If the first data signal is a reply signal, the first data signal can be transmitted in response to receiving the master-slave detection signal from another actuator via a bidirectional communications link.

Process 800 is shown to include monitoring the bidirectional communications link for a second data signal (step 804). The second data signal can be a reply signal or a master-slave detection signal. If the first data signal is a master-slave detection signal, the second data signal can be the reply signal. If the first data signal is a reply signal, the second data signal can be the master-slave detection signal.

In various embodiments, the order of steps 802 and steps 804 can be reversed. For example, if the first data signal is the master-slave detection signal and the second data signal is the reply signal, step 802 can be performed before step 804. However, if the first data signal is the reply signal and the second data signal is the master-slave detection signal, step 802 can be performed before after 804.

Process 800 is shown to include selecting an operating mode for at least one of the first actuator and the second actuator based on whether the second data signal is received via the bidirectional communications link (step 806). If the second data signal is the master-slave detection signal, step 806 can include selecting the slave operating mode for the actuator. If the second data signal is the reply signal, step 806 can include selecting the master operating mode for the actuator. If neither the master-slave detection signal nor the reply signal are received via the bi-directional communications link, step 806 can include selecting the non-linked (e.g., normal) operating mode for the actuator.

Referring now to FIG. 9, a flowchart of a process 900 for automatically selecting an operating mode for a HVAC actuator is shown, according to some embodiments. Process 900 can be performed by any actuator in a HVAC system (e.g., damper actuators 54-58, valve actuators 88-90, fan actuators, pump actuators, etc.). In some embodiments, process 900 is performed by a processing circuit of a HVAC actuator. For example, process 900 can be performed by processing circuit 134 or by microcontroller 716 of one of actuators 102-106, as described with reference to FIGS. 3-7.

Process 900 is shown to include transmitting a master-slave detection signal via a feedback data connection of an actuator (step 902). If the actuator is arranged as a master actuator, the feedback data connection can be connected with an input data connection of another actuator. The connection between actuators can be a bidirectional communications link. However, if the actuator is arranged as a slave actuator or in a non-linked arrangement, the feedback data connection may not be connected with the input data connection of another actuator.

Process 900 is shown to include monitoring an input data connection of the actuator for the master-slave detection signal (step 904). If the actuator is arranged as a slave actuator, the input data connection can be connected with a feedback data connection of another actuator. If the other actuator also transmits the master-slave detection signal via its feedback data connection, the master-slave detection signal will be received at the input data connection in step 904. However, if the actuator is arranged as a master actuator or in a non-linked arrangement, the input data connection may not be connected with the feedback connection of another actuator and the master-slave detection signal will not be received in step 904.

Process 900 is shown to include transmitting a reply signal via the input data connection in response to detecting the master-slave detection signal at the input data connection (step 906). Step 906 is an optional step that can be performed if the master-slave detection signal is detected in step 904. The master-slave detection signal can be detected in step 904 if the actuator is arranged as a slave actuator. If the actuator is not arranged as a slave actuator, the master-slave detection signal may not be received in step 904 and step 906 may not be performed.

Process 900 is shown to include monitoring the feedback data connection for the reply signal (step 908). If the actuator is arranged as a master actuator, the feedback data connection can be connected with an input data connection of another actuator. If the other actuator also performs process 900, the reply signal can be received in step 908. However, if the actuator is arranged as a slave actuator or in a non-linked arrangement, the feedback data connection may not be connected with the input data connection of another actuator and the reply signal will not be received in step 908.

Process 900 is shown to include selecting an operating mode for the actuator based on whether the master-slave detection signal or the reply signal is detected by the monitoring (step 910). If the monitoring in step 904 detects the master-slave detection signal, step 910 can include setting the operating mode for the actuator to a slave operating mode. If the monitoring in step 908 detects the reply signal, step 910 can include setting the operating mode for the actuator to a master operating mode. If neither of the monitoring steps detect the master-slave detection signal or the reply signal, step 910 can include setting the operating mode for the actuator to a non-linked (e.g., normal) operating mode.

Figure 10:
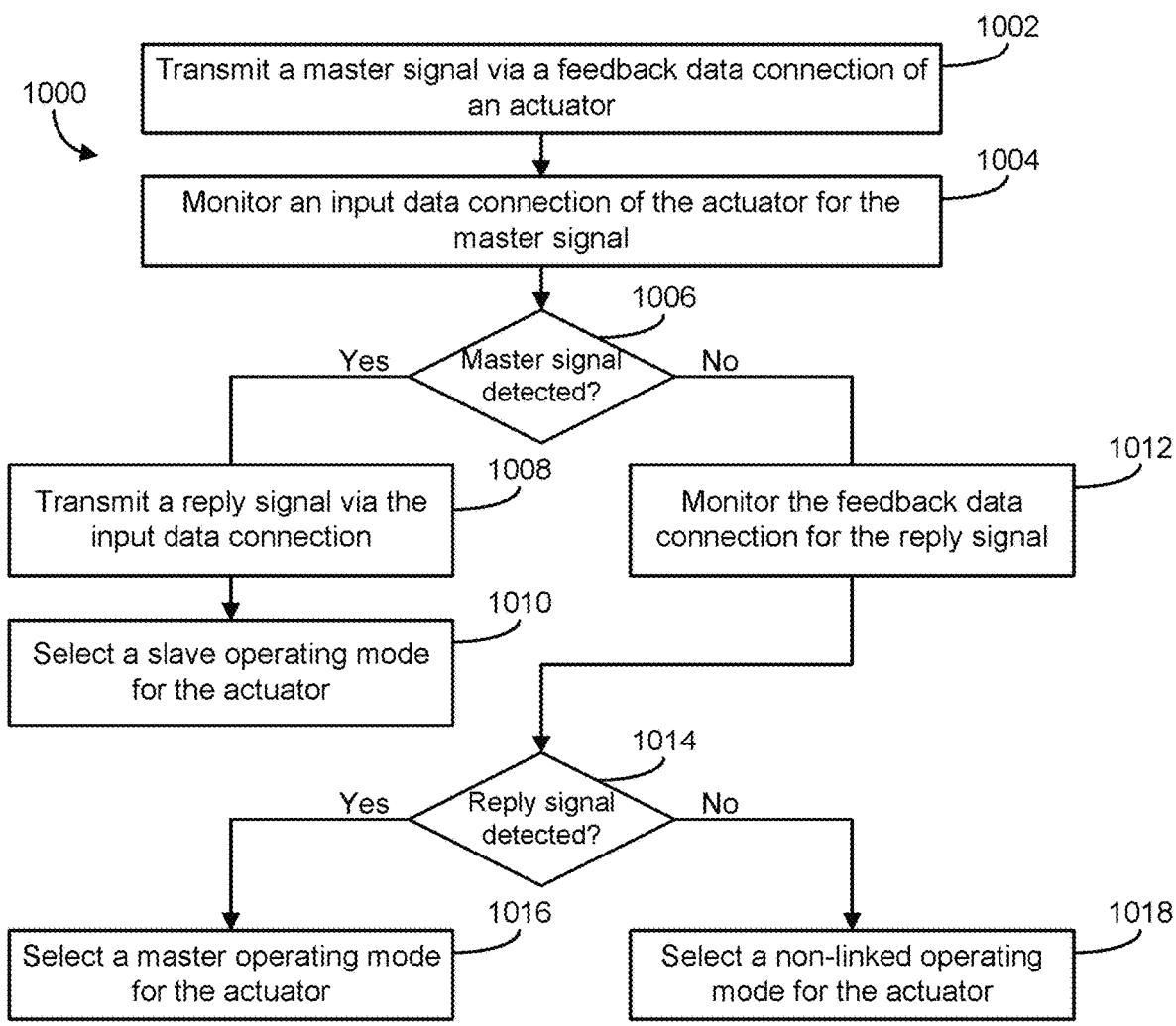
FIG. 10 is a flowchart of yet another process for automatically selecting an operating mode for a HVAC actuator, according to some embodiments.

Referring now to FIG. 10, a flowchart of a process 1000 for automatically selecting an operating mode for a HVAC actuator is shown, according to some embodiments. Process 1000 can be performed by any actuator in a HVAC system (e.g., damper actuators 54-58, valve actuators 88-90, fan actuators, pump actuators, etc.). In some embodiments, process 1000 is performed by a processing circuit of a HVAC actuator. For example, process 1000 can be performed by processing circuit 134 or by microcontroller 716 of one of actuators 102-106, as described with reference to FIGS. 3-7.

Process 1000 is shown to include transmitting a master signal via a feedback data connection of an actuator (step 1002). If the actuator is arranged as a master actuator, the feedback data connection can be connected with an input data connection of another actuator. The connection between actuators can be a bidirectional communications link. However, if the actuator is arranged as a slave actuator or in a non-linked arrangement, the feedback data connection may not be connected with the input data connection of another actuator.

Process 1000 is shown to include monitoring an input data connection of the actuator for the master signal (step 1004). If the actuator is arranged as a slave actuator, the input data connection can be connected with a feedback data connection of another actuator. If the other actuator also transmits the master signal via its feedback data connection, the master signal will be received at the input data connection in step 1004. However, if the actuator is arranged as a master actuator or in a non-linked arrangement, the input data connection may not be connected with the feedback connection of another actuator and the master signal will not be received in step 1004.

Process 1000 is shown to include determining whether the master signal is detected at the input data connection (step 1006). If the master signal is detected at the input data connection of the actuator in step 1004 (i.e., the result of step 1006 is "yes"), process 1000 can proceed to transmitting a reply signal via the input data connection (step 1008) and selecting a slave operating mode for the actuator (step 1010).

If the master signal is not detected at the input data connection of the actuator in step 1004 (i.e., the result of step 1006 is "no"), process 1000 can proceed to monitoring the feedback data connection for the reply signal (step 1012). If the actuator is arranged as a master actuator, the feedback data connection can be connected with an input data connection of another actuator. If the other actuator also performs process 1000, the reply signal can be received in step 1012. However, if the actuator is arranged as a slave actuator or in a non-linked arrangement, the feedback data connection may not be connected with the input data connection of another actuator and the reply signal will not be received in step 1012.

Process 1000 is shown to include determining whether the reply signal is detected at the feedback data connection (step 1014). If the reply signal is detected at the feedback data connection of the actuator in step 1012 (i.e., the result of step 1014 is "yes"), process 1000 can proceed to selecting a master operating mode for the actuator (step 1016). If the reply signal is not detected at the feedback data connection of the actuator in step 1012 (i.e., the result of step 1014 is "no"), process 1000 can proceed to selecting a non-linked operating mode for the actuator (step 1018).

Wireless Configuration and Communication

Figure 11:
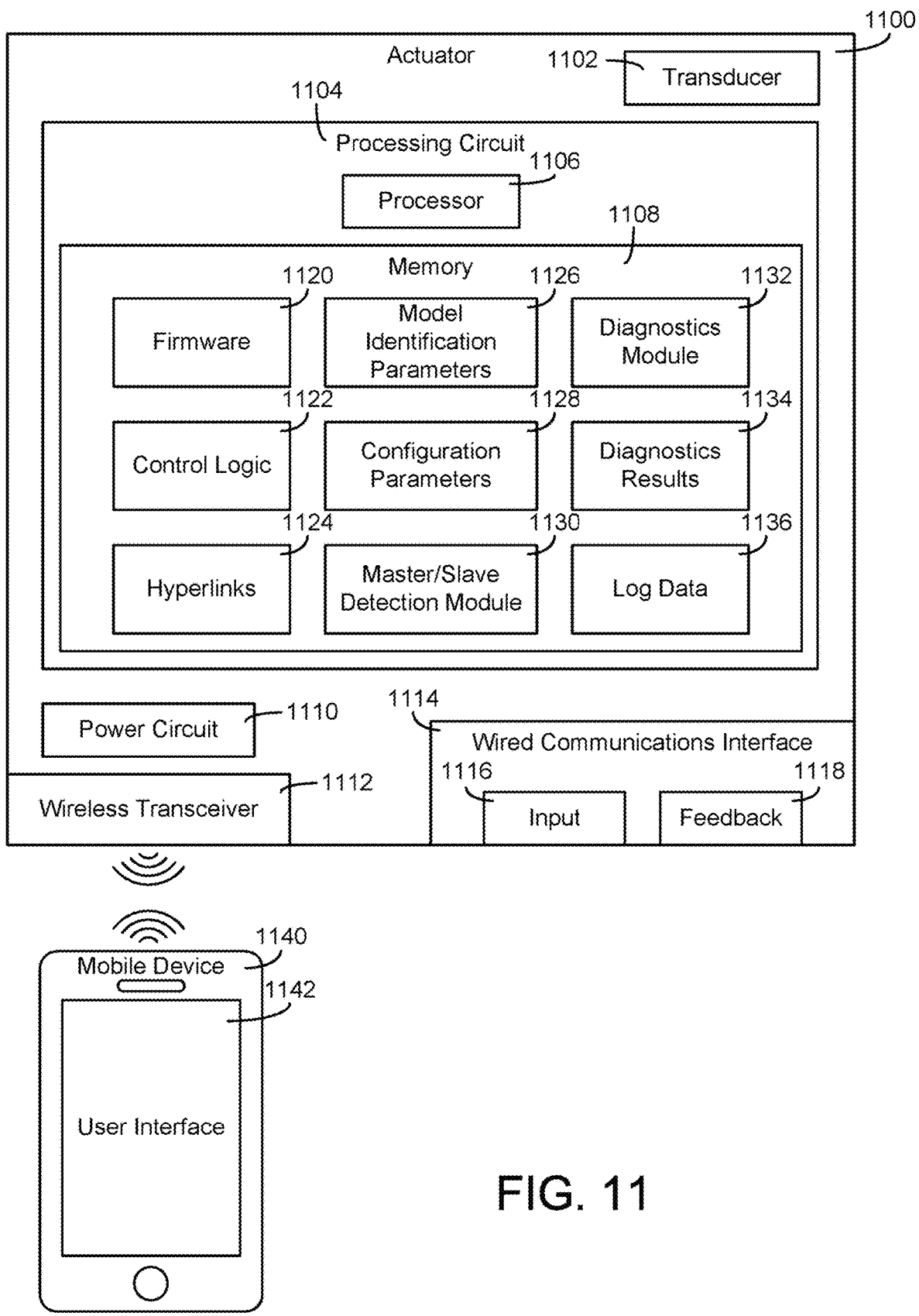
FIG. 11 is a block diagram of an actuator configured to wirelessly communicate with an external device without requiring any wired power or data connections to the actuator, according to some embodiments.

Referring now to FIG. 11, a block diagram of an actuator 1100 is shown, according to some embodiments. Actuator 1100 can be configured to wirelessly communicate with an external device (e.g., mobile device 1140, a controller, another actuator, etc.) to send and receive various types of data related to the operation of actuator 1100 (e.g., firmware data, control logic, model identification parameters, configuration parameters, diagnostic data, etc.). Advantageously, actuator 1100 can communicate with the external device without requiring any wired power or data connections to actuator 1100. This allows actuator 1100 to send and receive data in the event that physical access to actuator 1100 is limited. For example, actuator 1100 can be installed in a location that is not readily accessible by a user or service technician.

In some embodiments, actuator 1100 can communicate with external devices while actuator 1100 is still in its packaging at a manufacturer facility or a distributor location. Actuator 1100 can be constructed and packaged as a generic actuator and subsequently configured with suitable firmware, software, configuration parameters, or other data specific to a particular actuator model and/or implementation. Operational data such as end of line test data or other diagnostic data can be extracted from actuator 1100 without requiring a physical data connection.

Still referring to FIG. 11, actuator 1100 is shown to include a transducer 1102, a processing circuit 1104, a power circuit 1110, and a wireless transceiver 1112. Transducer 1102 can be any apparatus capable of providing forces and/or motion in response to a control signal. For example, transducer 1102 can be any of a variety of mechanical transducers such as rotary motors, linear motors, hydraulic or pneumatic pistons/motors, piezoelectric elements, relays, comb drives, thermal bimorphs, or other similar devices to provide mechanical motion. Transducer 1102 can provide any combination of linear, curved, or rotary forces/motion.

In some embodiments, transducer 1102 is connected with one or more mechanical components (e.g., gears, pulleys, cams, screws, levers, crankshafts, ratchets, etc.) capable of changing or affecting the motion provided by transducer 1102. In some embodiments, transducer 1102 may not produce significant motion in operation. For example, transducer 1102 can be operated to exert a force or torque to an external element (e.g., a holding force) without affecting significant linear or rotary motion.

Processing circuit 1104 can be configured to operate transducer 1102. Processing circuit 1104 is shown to include a processor 1106 and memory 1108. Processor 1106 can be a general purpose or specific purpose processor, an application specific integrated circuit (ASIC), one or more field programmable gate arrays (FPGAs), a group of processing components, or other suitable processing components. Processor 1106 can be configured to execute computer code or instructions stored in memory 1108 or received from other computer readable media (e.g., CDROM, network storage, a remote server, etc.).

Memory 1108 can include one or more devices (e.g., memory units, memory devices, storage devices, etc.) for storing data and/or computer code for completing and/or facilitating the various processes described in the present disclosure. Memory 1108 can include random access memory (RAM), read-only memory (ROM), hard drive storage, temporary storage, non-volatile memory, flash memory, optical memory, or any other suitable memory for storing software objects and/or computer instructions. Memory 1108 can include database components, object code components, script components, or any other type of information structure for supporting the various activities and information structures described in the present disclosure. Memory 1108 can be communicably connected to processor 1106 via processing circuit 1104 and can include computer code for executing (e.g., by processor 1106) one or more processes described herein.

Memory 1108 can store various types of data related to the operation of actuator 1100. For example, memory 1108 is shown to include firmware 1120, control logic 1122, and configuration parameters 1128. In some embodiments, control logic 1122 is a component of firmware 1120. Control logic 1122 can include one or more control programs that are used by processing circuit 1104 to operate transducer 1102. The control program can include logic for operating transducer 1102 based on variable configuration parameters (e.g., configuration parameters 1128) that are separate from the control program. Configuration parameters 1128 can include, for example, operational parameters such as actuation span (e.g., linear distance, degrees of rotation, etc.), offset, actuation speed, timing, or other parameters that configure actuator 1100 for a specific implementation.

Memory 1108 is shown to include model identification parameters 1126. In some embodiments, processing circuit 1104 is capable of operating multiple different actuator models. Model identification parameters 1126 can identify a particular actuator model and/or define configuration settings for a specific actuator model. Processing circuit 1104 can use model identification parameters 1126 to operate transducer 1102 according to configuration settings and/or control logic specific to the actuator model identified by model identification parameters 1126.

Memory 1108 is shown to include hyperlinks 1124. Hyperlinks 1124 can be links to a product information webpage, a product catalog, a product manual, an installation manual, an order form, or any other resource related to actuator 1100. In some embodiments, hyperlinks 1124 are specific to a particular actuator model defined by model identification parameters 1126. Hyperlinks 1124 can be communicated to a client device (e.g., mobile device 1140) via wireless transceiver 1112 and used by the client device to locate various resources associated with actuator 1100.

Memory 1108 is shown to include a diagnostics module 1132, diagnostics results 1134, and log data 1136. Diagnostics module 1132 can be configured to perform a diagnostic test of actuator 1100. Diagnostic tests can include, for example, a span or range test, a force/torque test, a calibration test, a failure modes test, a timing/speed test, or any other type of diagnostic test that can be performed by actuator 1100. Results of the diagnostic tests can be stored in memory 1108 as diagnostics results 1134. Diagnostics results 1134 can be communicated to an external system or device (e.g., a system controller, a field controller, an economizer controller, a client device, a factory or laboratory diagnostics system, etc.) via wireless transceiver 1112.

Log data 1136 can include any information related to the operation of actuator 1100. For example, log data 1136 can include actuator positions, control signal values, feedback signal values, an amount of force or torque exerted by actuator 1100, a measured temperature, or any other variable generated or used by actuator 1100. Log data 1136 can store information with time stamps indicating a time at which the stored values were used or observed by actuator 1100. Log data 1136 can be communicated to an external system or device to evaluate actuator performance and/or to perform external diagnostics.

Memory 1108 is shown to include a master/slave detection module 1130. Master-slave detection module 1130 can include the functionality of feedback generator 140, master signal detector 142, reply signal generator 146, reply signal detector 148, and operating mode selector 144, as described with reference to FIG. 4. For example, master-slave detection module 1130 can be configured to use a master-slave detection signal communicated via wireless transceiver 1112 and/or wired communications interface 1114 to select an operating mode for actuator 1100. The operating modes can include a master operating mode, a slave operating mode, and a non-linked operating mode. Processing circuit 1104 can be configured to operate transducer 1102 in response to a control signal received wireless transceiver 1112 and/or wired communications interface 1114 according to the selected operating mode.

Still referring to FIG. 11, actuator 1100 is shown to include a power circuit 1110. Power circuit 1110 can be configured to draw power from a wireless signal (e.g., an alternating magnetic or electric field) received via wireless transceiver 1112. For example, wireless transceiver 1112 can include an antenna coil that is exposed to a magnetic or electric field. The field can be produced by mobile device 1140 or another external device. In some embodiments, the magnetic or electric field is a NFC field (i.e., an alternating magnetic field with a frequency of approximately 13.56 MHz, compatible with near field communications (NFC) devices). The magnetic field can induce a voltage in power circuit 1110. In some embodiments, power circuit 1110 stores energy derived from the wireless signal using one or more capacitors.

Advantageously, power circuit 1110 can be configured to power processing circuit 1104 and wireless transceiver 1112 using the power drawn from the wireless signal received at wireless transceiver 1112. This advantage allows actuator 1100 to engage in bidirectional communications with an external device regardless of whether actuator 1100 receives power from a wired power connection. For example, actuator 1100 can communicate with external devices while actuator 1100 is still in its packaging at a manufacturer facility or a distributor location. Actuator 1100 can be constructed and packaged as a generic actuator and subsequently configured with suitable firmware, software, configuration parameters, or other data specific to a particular actuator model and/or implementation.

Still referring to FIG. 11, actuator 1100 is shown to include a wireless transceiver 1112. Wireless transceiver 1112 can be configured to facilitate bidirectional wireless data communications between processing circuit 1104 and an external device (e.g., mobile device 1140). Wireless transceiver can be used by processing circuit 1104 to transmit data stored in memory 1108 to the external device and/or to wirelessly receive data from the external device. In some embodiments, the external device includes a user interface 1142 that can be used to view the data communicated via wireless transceiver 1112.

Data communicated via wireless transceiver 1112 can include firmware data 1120, control logic data 1122, hyperlinks 1124, model identification parameters 1126, configuration parameters 1128, master-slave detection logic or signals, diagnostics logic or results 1134, log data 1136, device identifiers (e.g., serial numbers, MAC addresses, etc.), or any other type of information used by actuator 1100 and/or stored in memory 1108. Processing circuit 1104 can retrieve data from memory 1108 and transmit the retrieved data to the external device via wireless transceiver 1112. Processing circuit 1104 can receive data from the external device via wireless transceiver 1112 and store the received data in memory 1108.

Wireless transceiver 1112 can utilize any of a variety of wireless technologies and/or communications protocols for wireless data communications. For example, wireless transceiver 1112 can use near field communications (NFC), Bluetooth, Bluetooth low energy (BLE), WiFi, WiFi direct, radio frequency communication (e.g., RFID, radio waves, etc.), optical communication, electromagnetic signals, sound transmission, or any other wireless communications technology.

Wireless transceiver 1112 can be configured to operate in a powered mode or a non-powered mode. In the powered mode, wireless transceiver 1112 can receive power from another energy source (e.g., a wired power connection, a battery, etc.). In the non-powered mode, wireless transceiver 1112 can draw power from an electromagnetic field, wave, or radiation using an antenna or receptor. Wireless transceiver 1112 can use any of a variety of wireless energy transfer technologies (e.g., electrodynamic induction, electrostatic induction, lasers, microwaves, etc.) to obtain or harvest energy wirelessly. Advantageously, wireless transceiver 1112 allows actuator 1100 to engage in bidirectional wireless data communications without requiring a wired power or data connection to an external device.

Still referring to FIG. 11, actuator 1100 is shown to include a wired communications interface 1114. In some embodiments, actuator 1100 uses wired communications interface 1114 to communicate with a controller (e.g., controller 100, described with reference to FIGS. 2-6), another actuator, or to an external system or device. In other embodiments, actuator 1100 uses wireless transceiver 1112 for such communications.

Wired communications interface 1114 is shown to include an input data connection 1116 and a feedback data connection 1118. If actuator 1100 is arranged as a master actuator, input data connection 1116 can be connected to the output of a controller and feedback data connection 1118 can be connected to the input connection of another actuator. If actuator 1100 is arranged as a slave actuator, input data connection 1116 can be connected to the feedback data connection of another actuator and feedback data connection 1118 can be connected to the input of the controller or may not be connected to anything. Wired communications interface 1114 can allow actuator 1100 to function as any of actuators 54-58, 88-90, or 102-106, as described with reference to FIGS. 2-6.

Figure 12:
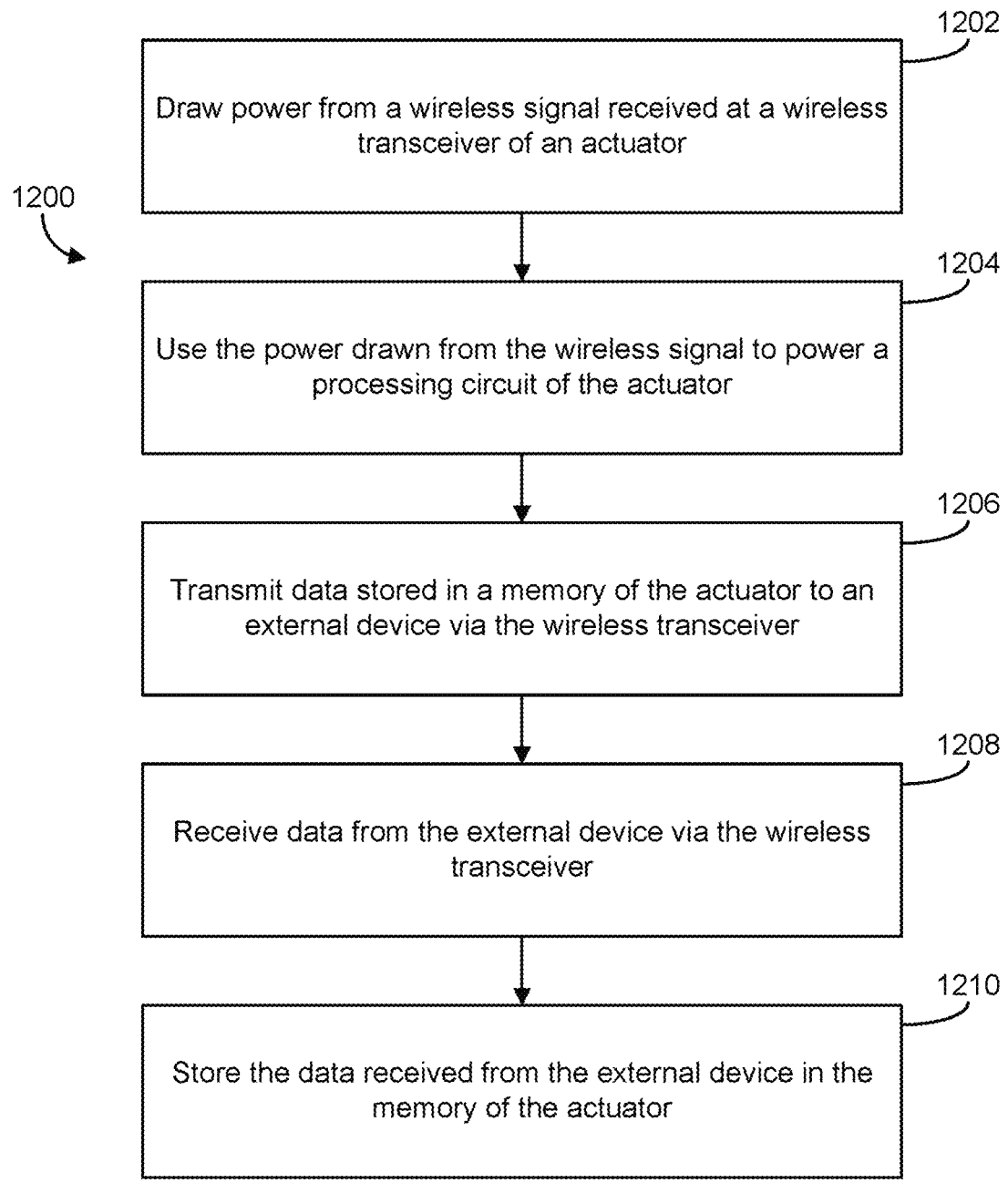
FIG. 12 is flowchart of a process for wirelessly configuring and communicating with an actuator in a HVAC system, according to some embodiments.

Referring now to FIG. 12, a flowchart of a process for wirelessly configuring and communicating with an actuator in a HVAC system is shown, according to some embodiments. In some embodiments, process 1200 is performed by actuator 1100, as described with reference to FIG. 11.

Process 1200 is shown to include drawing power from a wireless signal received at a wireless transceiver of an actuator (step 1202). Step 1202 can include drawing power from an electromagnetic field, wave, or radiation using an antenna or receptor. Step 1202 can include using any of a variety of wireless energy transfer technologies (e.g., electrodynamic induction, electrostatic induction, lasers, microwaves, etc.) to obtain or harvest energy wirelessly.

Process 1200 is shown to include using the power drawn from the wireless signal to power a processing circuit of the actuator (step 1204). The power drawn from the wireless signal can be stored in one or more capacitors within the actuator and can be used to power the processing circuit and/or the wireless transceiver. Advantageously, this allows the actuator to engage in bidirectional wireless data communications without requiring a wired power or data connection to an external device.

Process 1200 is shown to include transmitting data stored in a memory of the actuator to an external device via the wireless transceiver (step 1206) and receiving data from the external device via the wireless transceiver (step 1208). In some embodiments, process 1200 can include only one of steps 1206 and step 1208. For example, the actuator can transmit data stored in the memory of the actuator to the external device without receiving data from the external device. Alternatively, the actuator can receive data from the external device without transmitting data stored in the memory of the actuator. One or both of steps 1206 and 1208 can be performed in various implementations.

Data communicated via the wireless transceiver can include firmware data 1120, control logic data 1122, hyperlinks 1124, model identification parameters 1126, configuration parameters 1128, master-slave detection logic or signals, diagnostics logic or results 1134, log data 1136, device identifiers (e.g., serial numbers, MAC addresses, etc.), or any other type of information used by the actuator and/or stored in the memory of the actuator.

Process 1200 is shown to include storing the data received from the external device in the memory of the actuator (step 1210). Step 1210 can be performed in response to receiving data from the external device via the wireless transceiver. The data received from the wireless transceiver can replace existing data stored in the memory of the actuator or can be stored in free space within the memory of the actuator. For example, the actuator can be constructed and packaged as a generic actuator (e.g., without firmware data, control logic, and/or configuration parameters) and subsequently configured with suitable firmware, software, configuration parameters, or other data specific to a particular actuator model and/or implementation.

Near Field Communication and Configuration

Figure 13:
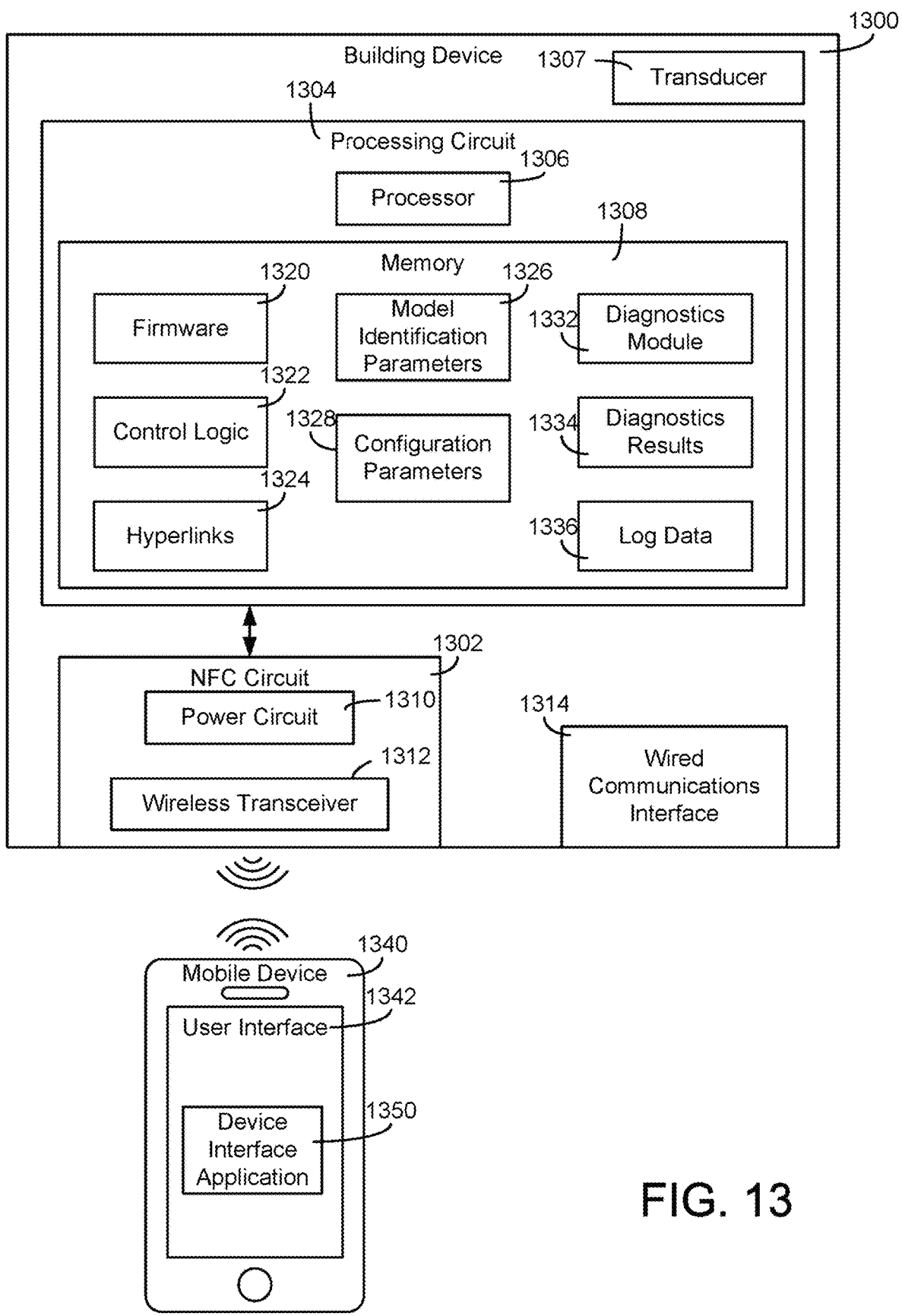
FIG. 13 is a block diagram of a building device configured to communicate with an external device via near field communication, according to some embodiments.

Referring now to FIG. 13, a block diagram of a building device 1300 is shown, according to some embodiments. Building device 1300 can be configured to wirelessly communicate with a nearby external device (e.g., mobile device 1340, etc.) to send and receive various types of data related to the operation of building device 1300 (e.g., firmware data, control logic, model identification parameters, configuration parameters, diagnostic data, etc.) using near field communication protocol. Advantageously, building device 1300 can communicate with the external device without requiring any wired power or data connections to building device 1300. This allows a user or service technician to send data to and receive data from building device 1300 using an external device brought into close proximity with building device 1300.

Building device 1300 can be any device utilized in a building automation system. For example, it is contemplated that building device can be an actuator (e.g., rotary actuator, linear actuator, etc.), a sensor (e.g., temperature sensor, pressure sensor, vibration sensor, humidity sensor, flow sensor, etc.), valves, controllers, and other types of devices that can be used for monitoring or controlling an automated system or process.

Data received from building device 1300 can include, for example, collected sensor data, diagnostic data, addresses, and alerts (e.g., fault conditions). Data sent to building device 1300 can include, for example, network addressing data, setpoint adjustments, model configuration (e.g., torque, travel time, model, transducer calibration, etc.), field parameters (e.g., DA/RA, span, offset, flow limitation, etc.), and firmware downloads. Near field communication between building device 1300 and the external device allows data to be retrieved from and written to building device 1300 without physically interacting with building device 1300, such as partially disassembling building device 1300 by removing an outer housing to access dip switches or other internal components. Near field communication between building device 1300 and the external device allows for a building device to be quickly and easily replaced with a replacement building device. For example, the current configuration of the building device being removed can be read by the external device, stored, and written to the replacement building device.

Still referring to FIG. 13, building device 1300 is shown to include a processing circuit 1302 and an NFC circuit 1310. Processing circuit 1302 is shown to include a processor 1306 and memory 1308. In some embodiments, building device 1300 can include a transducer 1304. For example, if building device 1300 is embodied as an actuator, transducer 1304 can be any apparatus capable of providing forces and/or motion in response to a control signal. Transducer 1304 can be any of a variety of mechanical transducers such as rotary motors, linear motors, hydraulic or pneumatic pistons/motors, piezoelectric elements, relays, comb drives, thermal bimorphs, or other similar devices to provide mechanical motion. Transducer 1304 can provide any combination of linear, curved, or rotary forces/motion. If building device 1300 is embodied as a sensor, transducer 1304 can be any apparatus capable of providing an electrical signal in response to a mechanical force or change in a characteristic of the environment. Transducer 1304 can be any of a variety of sensors, such as temperature sensors, pressure sensors, vibration sensors, flow sensors, humidity sensors, smoke detectors, occupancy sensors, CO2 sensors, or other various types of sensors.

Building device 1300 can be configured to in include multiple transducers. That is, a single building device 1300 can be able to be reconfigured to operate in different ways in a building system. As described in more detail below, building device 1300 can be programmed to utilize different transducers.

In some embodiments, transducer 1304 is connected with one or more mechanical components (e.g., gears, pulleys, cams, screws, levers, crankshafts, ratchets, etc.) capable of changing or affecting the motion provided by transducer 1304 or provided to transducer 1304. In some embodiments, transducer 1304 may not produce significant motion in operation. For example, transducer 1304 can be operated to exert a force or torque to an external element (e.g., a holding force) without affecting significant linear or rotary motion.

Processor 1306 can be a general purpose or specific purpose processor, an application specific integrated circuit (ASIC), one or more field programmable gate arrays (FPGAs), a group of processing components, or other suitable processing components. Processor 1306 can be configured to execute computer code or instructions stored in memory 1308 or received from other computer readable media (e.g., CDROM, network storage, a remote server, etc.). Processing circuit 1302 can be configured to operate transducer 1304. Processing circuit 1302 can be configured to receive signals from transducer 1304.

Memory 1308 can include one or more devices (e.g., memory units, memory devices, storage devices, etc.) for storing data and/or computer code for completing and/or facilitating the various processes described in the present disclosure. Memory 1308 can include random access memory (RAM), read-only memory (ROM), hard drive storage, temporary storage, non-volatile memory, flash memory, optical memory, or any other suitable memory for storing software objects and/or computer instructions. Memory 1308 can include database components, object code components, script components, or any other type of information structure for supporting the various activities and information structures described in the present disclosure. Memory 1308 can be communicably connected to processor 1306 via processing circuit 1302 and can include computer code for executing (e.g., by processor 1306) one or more processes described herein.

Memory 1308 can store various types of data related to the operation of building device 1300. For example, memory 1308 is shown to include firmware 1320, control logic 1322, and configuration parameters 1328. In some embodiments, control logic 1322 is a component of firmware 1320. Control logic 1322 can include one or more control programs that are used by processing circuit 1302 to operate transducer 1304 or to process electrical signals received from transducer 1304. The control program can include logic for operating transducer 1304 or utilizing electrical signals provided by transducer 1304 based on variable configuration parameters (e.g., configuration parameters 1328) that are separate from the control program. Configuration parameters 1328 can include, for example, operational parameters such as actuation span (e.g., linear distance, degrees of rotation, etc.), offset, actuation speed, timing, setpoints, or other parameters that configure building device 1300 for a specific implementation.

Memory 1308 is shown to include model identification parameters 1326. In some embodiments, processing circuit 1302 is capable of operating multiple different building device models. Model identification parameters 1326 can identify a particular building device model and/or define configuration settings for a specific building device model. Processing circuit 1302 can use model identification parameters 1326 to operate transducer 1304 or utilize electrical signals provided by transducer 1304 according to configuration settings and/or control logic specific to the building device model identified by model identification parameters 1326.

Memory 1308 is shown to include hyperlinks 1324. Hyperlinks 1324 can be links to a product information webpage, a product catalog, a product manual, an installation manual, an order form, or any other resource related to building device 1300. In some embodiments, hyperlinks 1324 are specific to a particular building device model defined by model identification parameters 1326. Hyperlinks 1324 can be communicated to a client device (e.g., mobile device 1340) via NFC circuit 1310 and used by the client device to locate various resources associated with building device 1300.

Memory 1308 is shown to include a diagnostics module 1332, diagnostics results 1334, and log data 1336. Diagnostics module 1332 can be configured to perform a diagnostic test of building device 1300. Diagnostic tests can include, for example, a span or range test, a force/torque test, a calibration test, a failure modes test, a timing/speed test, or any other type of diagnostic test that can be performed by building device 1300. Results of the diagnostic tests can be stored in memory 1308 as diagnostics results 1334. Diagnostics results 1334 can be communicated to an external system or device (e.g., a system controller, a field controller, an economizer controller, a client device, a factory or laboratory diagnostics system, etc.) via NFC circuit 1310. In some embodiments, results of the diagnostic test can be analyzed by processor 1106 and the analysis of the results of the diagnostic test can be communicated to an external system or device (e.g., a system controller, a field controller, an economizer controller, a client device, a factory or laboratory diagnostics system, etc.) via NFC circuit 1310.

Log data 1336 can include any information related to the operation of building device 1300. For example, log data 1336 can include building device positions, control signal values, feedback signal values, an amount of force or torque exerted by building device 1300, a measured temperature, or any other variable generated or used by building device 1300. Log data 1336 can store information with time stamps indicating a time at which the stored values were used or observed by building device 1300. Log data 1336 can be communicated to an external system or device to evaluate building device performance and/or to perform external diagnostics. In some embodiments, log data 1336 and/or diagnostics results 1334 include wired/wireless network information (e.g., network diagnostics, network logs, etc.). Network diagnostics can include, for example, failed message sends, a number of retries for failed message sends, network connectivity diagnostics, or any other type of diagnostic result pertaining to network configuration. Network logs can include, for example, a communications channel used by communications interface 1314, a wired/wireless network ID, a communications protocol, network address settings, or any other type of log information pertaining to network settings and/or connectivity.

Still referring to FIG. 13, building device 1300 is shown to include a communications interface 1314. In some embodiments, communications interface 1314 is a wired communications interface which is used by building device 1300 to communicate with a controller (e.g., controller 100, described with reference to FIGS. 2-6), another building device, or to an external system or device. In other embodiments, communications interface 1314 is a wireless communications interface (e.g., wireless transceiver) which is used by building device 1300 to communicate with a controller (e.g., controller 100, described with reference to FIGS. 2-6), another building device, or to an external system or device.

Communications interface 1314 can be configured to facilitate bidirectional data communications between processing circuit 1302 and an external device. Wireless transceiver can be used by processing circuit 1302 to transmit data stored in memory 1308 to the external device and/or to receive data from the external device.

Data communicated via communications interface 1314 can include, for example, sensor data collected by transducer 1304 or actuator control signal for transducer 1304. Processing circuit 1302 can retrieve data from memory 1308 and transmit the retrieved data to the external device via communications interface 1314. Processing circuit 1302 can receive data from the external device via communications interface 1314 and store the received data in memory 1308. In other embodiments, transducer 1304 and communications interface 1314 can communicate directly, without processing circuit 1302.

Communications interface 1314 can utilize any of a variety of wireless technologies and/or communications protocols for wireless data communications. For example, Communications interface 1314 can use any appropriate protocol, such as LON, BACnet, Bluetooth, Bluetooth low energy (BLE), WiFi, WiFi direct, Zigbee, radio frequency communication (e.g., RFID, radio waves, etc.), optical communication, electromagnetic signals, sound transmission, or any other wireless communications technology to communicate with other building devices.

Communications interface 1314 can be configured to operate in a powered mode or a non-powered mode. In the powered mode, communications interface 1314 can receive power from another energy source (e.g., a wired power connection, an on-board source 1312, etc.). In the non-powered mode, communications interface 1314 can draw power from an electromagnetic field, wave, or radiation using an antenna or receptor. Communications interface 1314 can use any of a variety of wireless energy transfer technologies (e.g., electrodynamic induction, electrostatic induction, lasers, microwaves, etc.) to obtain or harvest energy wirelessly. Advantageously, communications interface 1314 allows building device 1300 to engage in bidirectional wireless data communications without requiring a wired power or data connection to an external device.

Figure 14:
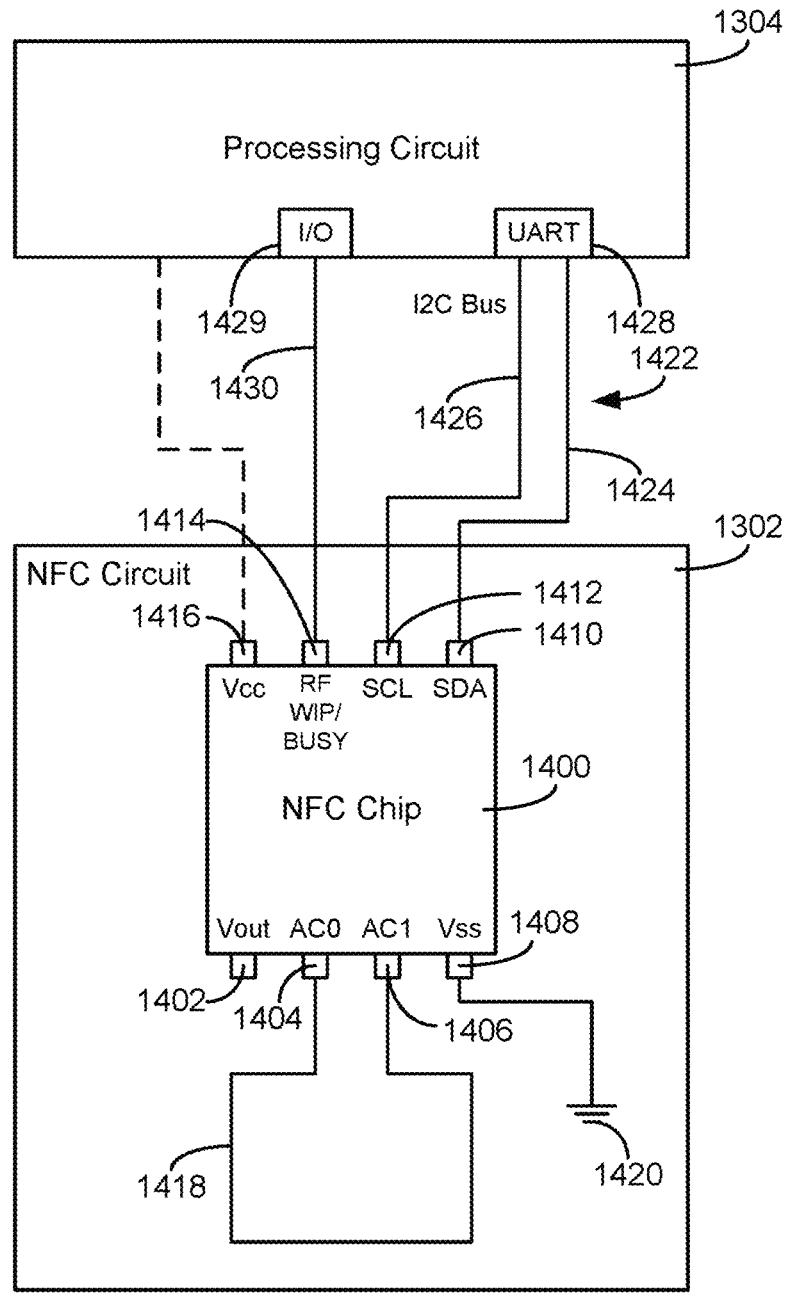
FIG. 14 is a detailed block diagram of an NFC circuit for the building device of FIG. 13, according to some embodiments.

Referring now to FIG. 14, NFC circuit 1310 is shown in more detail, according to some embodiments. NFC circuit 1310 includes an NFC chip 1400. NFC chip 1400 can be, for example, an M24LR series NFC chip, marketed by STMicroelectronics. According to some embodiments, NFC chip 1400 includes a Vout pin 1402, antenna coil (AC0, AC1)

pins 1404 and 1406, a Vcc pin 1408, a serial data (SDA) pin 1410, a serial clock (SCL) pin 1412, an RF WIP/BUSY pin 1414, and a Vcc pin 1416.

AC0 pin 1404 and AC1 pin 1406 are coupled to a pick-up antenna 1418. Antenna 1418 forms an inductive loop and is configured to inductively couple NFC chip 1400 to the external device (e.g., mobile device 1340). Antenna 1418 can be any conductive member formed in the shape of a loop. For example, antenna 1418 can be formed by a trace of a conductive material (e.g., copper) on a printed circuit board, or a trace on a chip antenna. In some embodiments, antenna 1418 can be formed as a trace on a flexible member (e.g., a flexible printed circuit board) to reduce the size of NFC circuit 1310 and facilitate the packaging of NFC circuit 1310 in building device 1300. Data can be exchanged between NFC chip 1400 and the external device and power can be received by NFC chip 1400 from the external device via AC pin 1404 and AC1 pin 1406.

Vss pin 1408 is connected to ground 1420. Power is received by NFC chip 1400 from the electromagnetic field generated by the external device via antenna 1418. Antenna 1418 can be configured to draw power from a wireless signal in the form of an alternating magnetic or electric field. The field can be produced by mobile device 1340 or another external device. In some embodiments, the magnetic or electric field is a NFC field (i.e., an alternating magnetic field with a frequency of approximately 13.56 MHz, compatible with near field communications (NFC) devices). The magnetic field can induce a voltage in antenna 1418. In some embodiments, NFC circuit 1410 stores energy derived from the wireless signal using one or more capacitors.

By harvesting power from the electromagnetic field generated by the external device, no power connection is needed between processing circuit 1302 and NFC chip 1400. If building device 1300 is a wireless device powered by an on-board power source 1312, this allows NFC chip 1400 to operate without decreasing the life of on-board power source 1312. In some embodiments, power can be received by NFC chip 1400 from another device via Vcc pin 1416. In some embodiments, power can be supplied from NFC chip 1400 to another device via Vout pin 1402.

Advantageously, NFC circuit 1310 can be configured to provide power to processing circuit 1302 and communications interface 1314 using the power drawn from the wireless signal received at antenna 1418. This advantage allows building device 1300 to engage in bidirectional communications with an external device regardless of whether building device 1300 receives power from a wired power connection. For example, building device 1300 can communicate with external devices while building device 1300 is still in its packaging at a manufacturer facility or a distributor location. Building device 1300 can be constructed and packaged as a generic building device and subsequently configured with suitable firmware, software, configuration parameters (e.g., timing, DA/RA, etc.), or other data specific to a particular building device model and/or implementation. Building device 1300 can also communicate with external devices when installed or uninstalled. For example, diagnostic information can be read from building device 1300 by an external device via NFC when in a factory or distribution facility to determine faulty units, in the field, or in a lab after building device 1300 has been removed and replaced (e.g., due to malfunction or failure).

NFC chip 1400 is coupled to processing circuit 1302 via an inter-integrated circuit (I2C) bus 1422. I2C bus 1422 includes an SDA line 1424 connecting SDA pin 1410 to a universal asynchronous receiver/transmitter (UART) port 1428 of processing circuit 1302 and an SCL line 1426 connecting SCL pin 1410 to UART port 1428. SDA line 1424 is a bi-directional data line configured for the transfer of data between processing circuit 1302 and NFC chip 1400. SCL line 1426 is a unidirectional signal line configured for the transfer of a synchronous clock signal from processing circuit 1302 to NFC chip 1400. Processing circuit 1302 is configured to allow NFC chip 1400 to access and modify various data stored in memory 1308, including, for example, network addresses, model numbers, manufacturing date codes, firmware for processing circuit 1302, wireless network diagnostic information, sensor input values (e.g., switch settings, temperature readings, RH readings, PIR sensor readings, button states, etc.), setpoint adjustments, model configuration data (e.g., torque, travel time, transducer calibration, etc.), field parameters (e.g., DA/RA, span, offset, flow limitation, etc.), and/or any other type of data that can be communicated via NFC circuit 1310.

NFC chip 1400 is further coupled to processing circuit 1302 via an RF WIP/BUSY line 1430. RF WIP/BUSY line 1430 connects RF WIP/BUSY pin 1414 to an I/O port 1429 of processing circuit 1302. An RF WIP/BUSY signal can be transmitted from NFC chip 1400 to processing circuit 1302 over RF WIP/BUSY line 1430 to provide a timing and flow control mechanism for processing circuit 1302. The RF WIP/Busy signal can facilitate timing of data transfer between processing circuit 1302 and NFC chip 1400.

In some embodiments, NFC circuit 1310 can be configured to change the behavior of processing circuit 1302. For example, processing circuit 1302 can operate in a non-powered or low-power mode. Upon establishing a wireless communications connection with an external device, NFC circuit 1310 can transmit a wake up signal to processing circuit 1302. The signal wakes up processing circuit 1302 from the non-powered or low-power mode to draw power from a power source, such as on-board power source 1312, thereby reducing the power drawn from NFC circuit 1310. Waking processing circuit 1302 to draw power from on-board power source 1312 can be advantageous if insufficient power is harvested by NFC circuit 1310 from the electromagnetic field generated by the external device to operate processing circuit 1302.

In some embodiments, building device 1300 can communicate with external devices while building device 1300 is still in its packaging at a manufacturer facility or a distributor location. Building device 1300 can be constructed and packaged as a generic device and subsequently configured with suitable firmware, software, configuration parameters, or other data specific to a particular building device model and/or implementation. For example, a model number can be written to memory 1308 including feature flags. The feature flags can be subsequently utilized to activate desired parameters and sensing elements (e.g., transducer 1304). Operational data such as end of line test data or other diagnostic data can be extracted from building device 1300 without requiring a physical data connection.

Referring again to FIG. 13, mobile device 1340 can include a device interface application 1350. Device interface application 1350 provides user-end functionality by providing the user with a visual interface to view the data communicated via NFC circuit 1310. Device interface application 1350 is configured to display to a user all relevant information related to building device 1300 and provide the user with a means to easily view and change values for building device 1300. In some embodiments, device interface application 1350 can be activated manually by a user and can activate the NFC system of mobile device 1340 to facilitate near field communication between building device 1300 and mobile device 1340 if mobile device 1340 is brought into close proximity (e.g., within 4 cm) of building device 1300. In some embodiments, device interface application 1350 can be launched automatically if mobile device 1340 is brought into close proximity of building device 1300. In some embodiments, device interface application can allow a user to view all relevant information related to building device, but may require additional login credentials (e.g., password, user name, biometric data, etc.) to make changes to values for building device 1300.

Using an external device (e.g., mobile device 1340) with device interface application 1350, a user can perform various upgrade, data acquisition, and maintenance activities related to building devices 1300. For example, a user can perform field upgrades and field-configurations without physically interacting with building device 1300 (e.g., opening a case to access physical dip-switches, making a wired connection between the external device and building device 1300, manipulating a user interface of building device 1300, etc.). The functionality provided by the wireless connection between building device 1300 and the external device can be advantageous if building device 1300 is installed in a hard to reach location.

Figures 15D, 15E:
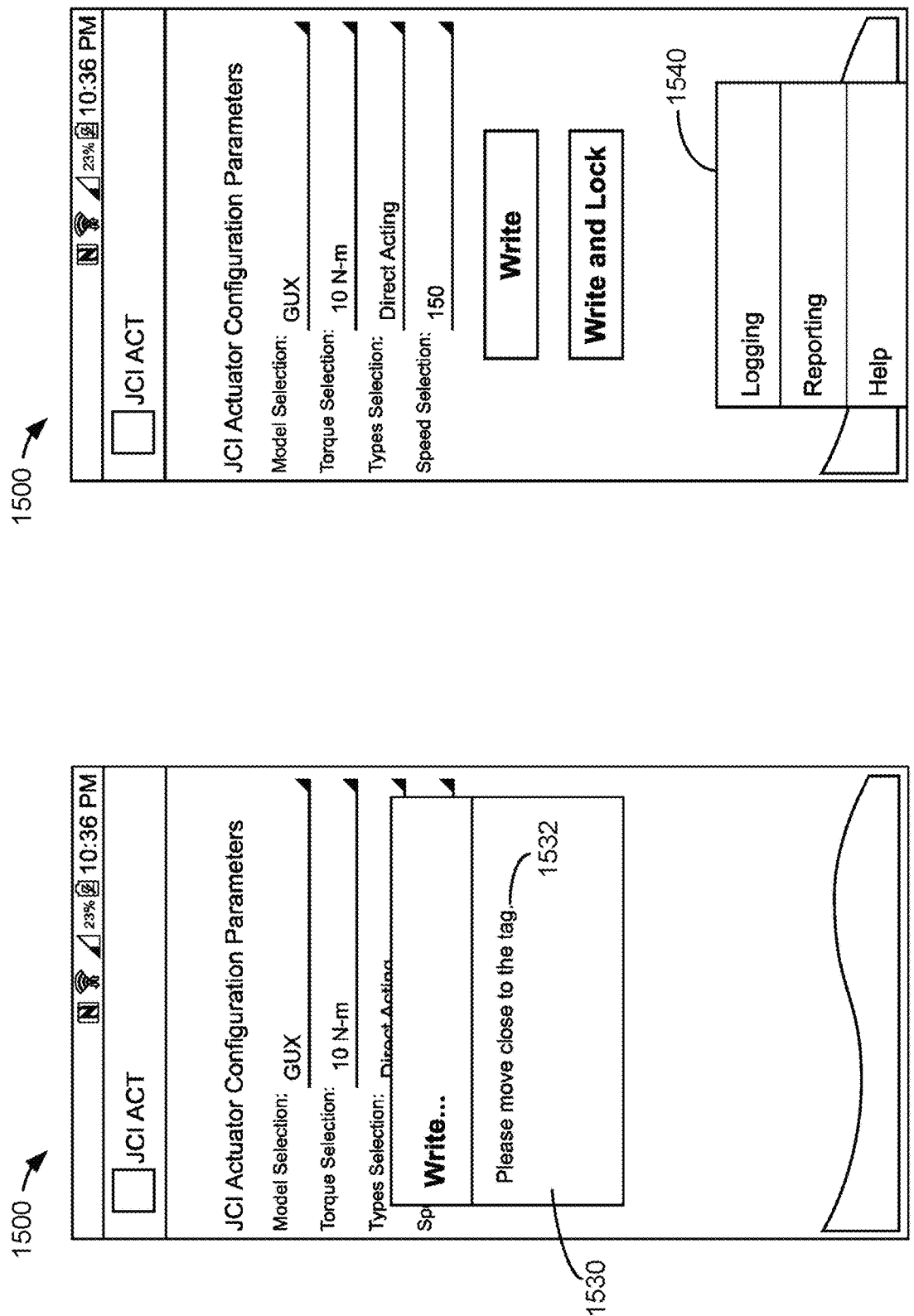

Referring now to FIGS. 15A-15G, a graphical user interface (GUI) 1500 for a device interface application 1350 is shown according to some embodiments. Referring to FIG. 15A, device interface application 1350 is launched using an icon, widget, menu selection, or other launch object 1502. In some embodiments, device interface application 1350 is launched automatically when the external device is brought into close proximity with an appropriate building device, which is detected by the NFC chip of the external device.

Referring now to FIG. 15B, in some embodiments, once application 1350 is launched and near field communication is established between the external device and the building device, a configuration screen 1504 is presented to the user. In some embodiments, configuration screen 1504 displays configuration parameters 1506 associated with the building device. For example, for a building device embodied as an actuator, configuration parameters 1506 can include model 1508, torque 1510, types 1512, speed 1514, etc. A user can select the desired configuration parameter from a drop down list.

Referring now to FIG. 15C, in some embodiments, configuration screen 1504 includes a current configuration display 1520. Current configuration display 1520 includes current configuration parameters of the building device, which are read by the external device via NFC. For example, current configuration display 1520 can include information a tag identification number 1522, memory block data 1524, current parameters 1526 (e.g., model, torque, types, speed, etc.), and the time and date 1528 of the last changes to the building device parameters.

Once the desired configuration parameters are selected by the user, the configuration parameters are transmitted to the building device (e.g., transmitted over NFC and stored in memory). For example, the configuration parameters can be transmitted to the building device by selecting a write button 1516, or can be transmitted to the building device along with an instruction to lock the configuration parameters by selecting a write and lock button 1518. Locking a configuration parameter may require a user to enter authentication credentials (e.g., password, user name, biometric data, etc.) to make further changes to the configuration parameter. Current configuration display 1520 can be updated after the user has written the data to the building device (e.g., by selecting write button 1516 or write and lock button 1518) to allow the user to confirm that the correct data has been transmitted to the building device. In some embodiments, current configuration display 1520 can include an indication (e.g., a checkmark, a ticked box, a padlock icon, etc.) to indicate if a particular parameter has been locked in a previous action. The parameters presented in current configuration display 1520 may vary based on the type of building device (e.g., actuator, sensor, controller, etc.).

Referring now to FIG. 15D, upon receiving instructions to write data to the building device (e.g., by the user selecting write button 1516 or write and lock button 1518), a status display 1530 can be presented to the user. Status display 1530 indicates to the user if data is being written from the external device to the building device or if data is being read from the building device by the external device. In some embodiments, status display 1530 can provide instructions 1532 to the user. For example, instructions 1532 can instruct the user to position the external device in close proximity of the building device. In some embodiments, status display 1530 provides feedback to the user to indicate whether the requested operation (e.g., reading or writing) completes successfully or fails Referring now to FIG. 15E, a user can access other modes of application 1350 through a pop-up menu 1540. Pop-up menu 1540 includes a variety of modes of operation, such as a logging mode, a reporting mode, and a help mode.

Figure 15F:
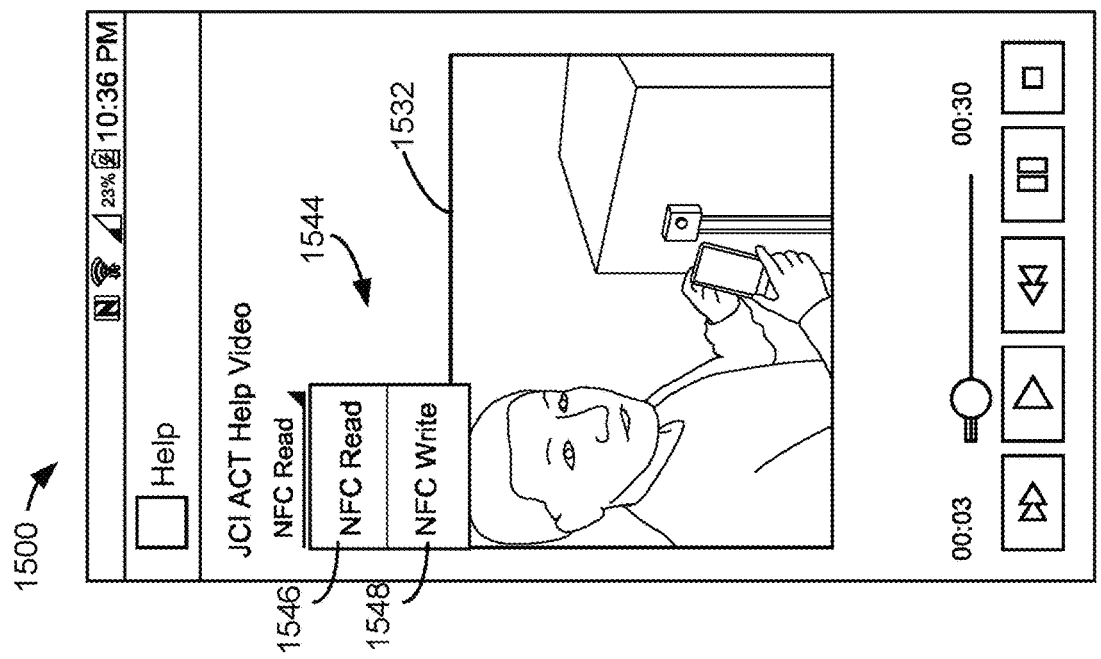

Referring to FIG. 15F, in some embodiments, help mode includes instructions, such as text tutorials, visual tutorials, and video tutorials. A menu 1544 includes options for multiple help topics, such as a NFC Read option 1546 and a NFC Write option 1548. Playback or navigation controls 1555 are provided to allow a user to navigate (e.g., scroll, play, skip, etc.) the presented help materials. In some embodiments, the help mode includes documentation specific to the building device. Hyperlinks can be stored in memory in the building device or in the device interface application 1350. The hyperlink can be used to access product manuals, installation manuals or order forms.

Figures 15G, 15H:
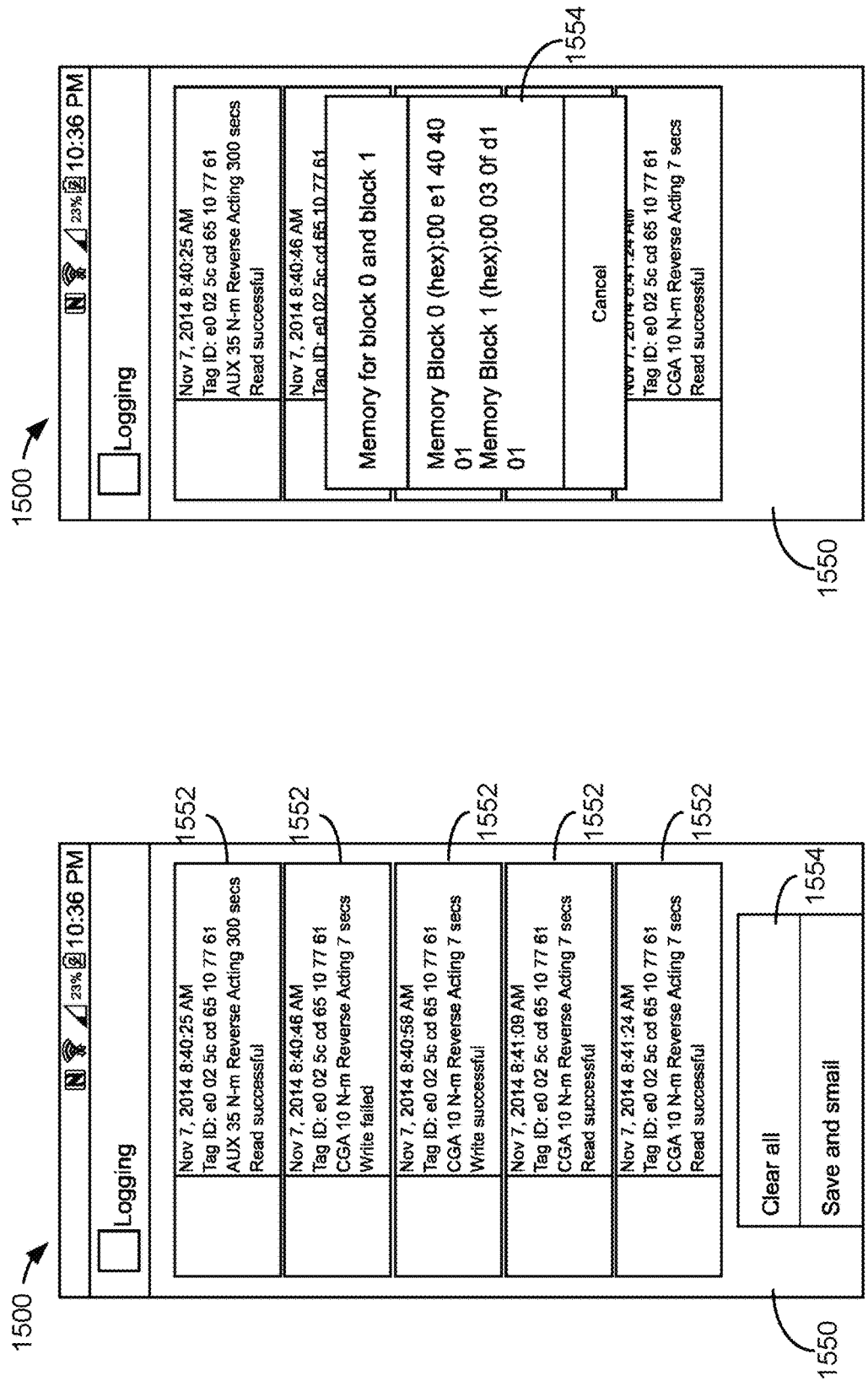
Figure 16:
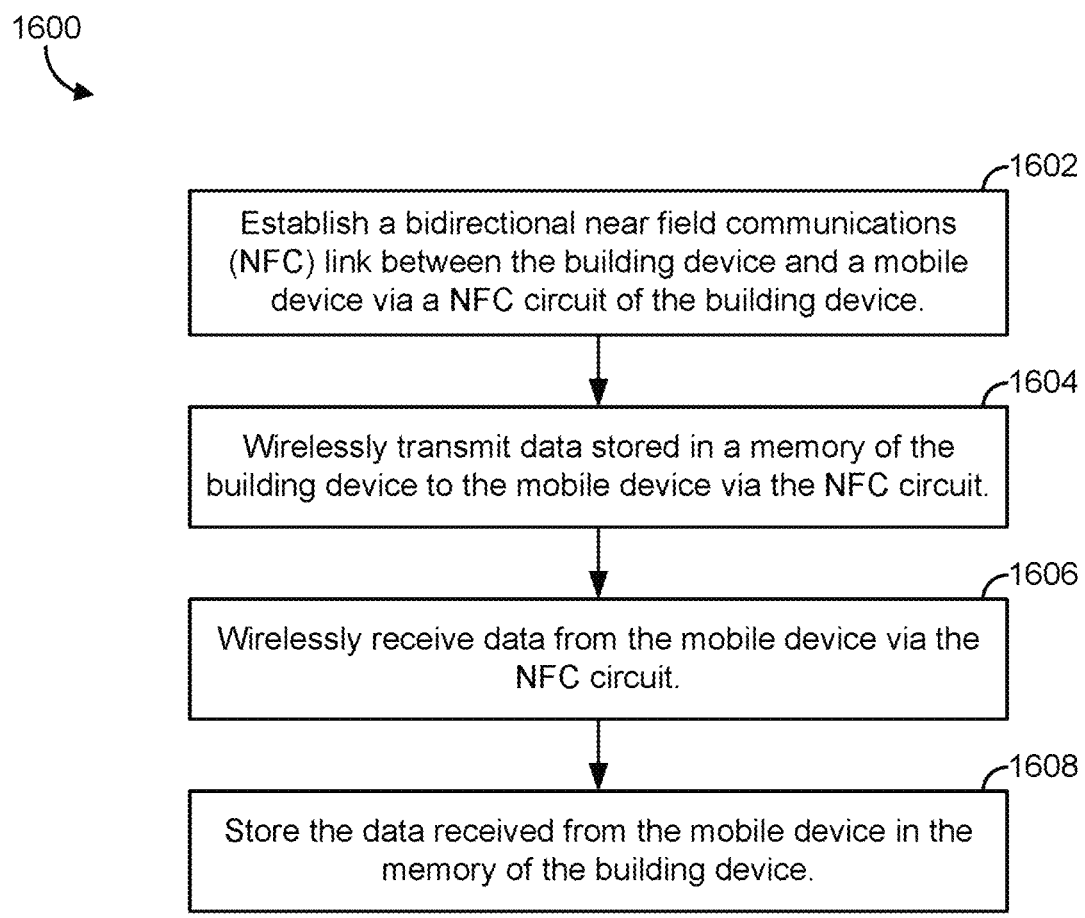
FIG. 16 is a flowchart of a process for configuring and communicating with a building device via NFC, according to some embodiments.

Referring now to FIG. 15G, in some embodiments, in a logging mode, a logging screen 1550 is presented to the user. The logging mode allows the user to read data from the building device. Logging screen 1550 includes log entries 1552 corresponding to reading and writing operations for the building device. In some embodiments, log entries 1552 includes a timestamp, a tag identification number, configuration parameters (e.g., model, torque, types, speed, etc.), action performed (e.g., reading or writing), whether the action was successful or failed, and error or troubleshooting messages (e.g., invalid parameter input). In some embodiments, log entries include a visual representation of the building device. In some embodiments, the user can select the range of log entries presented, for example, all entries over a defined time period (e.g., entries from the previous month) or a defined number of previous entries (e.g., past 5 entries). In some embodiments, a pop-up menu 1554 is presented to the user with additional options, such as a clear all option and a save and mail option. The clear all option allows the user to clear all log entries 1552. The save and mail option allows the user to save all or a portion of log entries 1552 and send them to another device. For example, a user can be allowed to send log entries 1552 to a desktop computer, a central server, a mail recipient, etc.

In some embodiments, a logging mode can be utilized to analyze data from the building device over a period of time. For example, information can be logged and time stamped in the building device and a trend can be plotted on the external device. In some embodiments, the external device is left in close proximity to the actuator and to gather data at periodic intervals to determine a trend.

Referring to FIG. 15H, in some embodiments, a detailed parameters window 1556 is shown when a log entry 1552 is selected. Detailed parameter window 1556 presents additional information to the user, such as individual memory block data. The information presented in detailed parameter window 1556 can be transmitted with the information presented in log entries 1552 when log entries are transmitted to another device.

In some embodiments, device interface application 1350 includes features directed towards a specific type of building device or feature of the building device. In some embodiments, the building devices are installed in a master/slave configuration. The external device can automatically establish which device is the master and which devices are slaves via NFC. In some embodiments, a building device is placed into a manual override mode during commissioning. The building device can be placed in a manual override mode while the device is powered or unpowered. The building device can also be placed into a commissioning override mode when powered to place the device at set points. In some embodiments, the device interface application 1350 is configured for use with a heat exchanger. The external device can trend temperature and drive the unit on the valve in step change. A temperature sensor on the external device can detect changes of temperature based on changes of valve opening.

Referring now to FIG. 10, a flowchart of a process 1600 for configuring and communicating with a building device is shown, according to some embodiments. In some embodiments, process 1600 is performed by a processing circuit of a building device. For example, process 1600 can be performed by processing circuit 1302 of building device 1300, as described with reference to FIGS. 13-15H.

Process 1600 is shown to include establishing a bidirectional near field communications (NFC) link between the building device and a mobile device via a NFC circuit of the building device (step 1602). The NFC link can be established automatically if the mobile device is brought within a minimum distance (e.g., 4 inches) from the building device. The NFC link can be initiated via a command from an application being run on the mobile device.

Process 1600 is shown to include wirelessly transmitting data stored in a memory of the building device to the mobile device via the NFC circuit (step 1604). The data stored in a memory of the building device and wirelessly transmitted to the mobile device via the NFC circuit can be an access log entry. The log entry can include a variety of information, such as a timestamp, a tag identification number, a configuration parameter, a type of action performed, or a troubleshooting message.

Process 1600 is shown to include wirelessly receiving data from the mobile device via the NFC circuit (step 1606). The data wirelessly received from the mobile device via the NFC circuit, and stored in the memory of the building device can include configuration parameters associated with the building device. For example, if the building device is an actuator, the configuration parameters can include a model, a torque, an actuator type, and a speed.

Process 1600 is shown to include storing the data received from the mobile device in the memory of the building device (step 1608). In some embodiments, data received from the mobile device can be stored in the model identification parameter module of the memory.

Configuration of Exemplary Embodiments

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium can be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific embodiment details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product embodied on a tangible medium or packaged into multiple such software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing can be advantageous.

The background section is intended to provide a background or context to the invention recited in the claims. The description in the background section can include concepts that could be pursued, but are not necessarily ones that have been previously conceived or pursued. Therefore, unless otherwise indicated herein, what is described in the background section is not prior art to the description or claims and is not admitted to be prior art by inclusion in the background section.

What is claimed is:

1. A non-transitory computer-readable storage medium having an application stored thereon that, when executed by at least one processing circuit, cause the processing circuit to perform operations for configuring a building device of an HVAC system, the application being for execution on a mobile device comprising a display, the application comprising instructions for:
receiving a plurality of configuration parameters of the building device from the building device using near field communication (NFC);

receiving logging data associated with the building device from the building device using NFC, the logging data comprising operational data and time stamps corresponding to the operational data;

displaying at least a portion of the plurality of configuration parameters in a configuration screen on the display, wherein the configuration screen provides an identification of the building device;

responsive to a command entered on a user interface of the mobile device, updating the display to display at least a portion of the logging data in a logging screen on the display, wherein the logging screen provides at least a portion of the operational data and the time stamps corresponding to the at least the portion of the operational data;

receiving a configuration parameter update, the configuration parameter update replacing or modifying at least one of the configuration parameters; and transmitting the configuration parameter update to the building device via NFC.

2. The non-transitory computer-readable storage medium of claim 1, wherein the plurality of configuration parameters includes at least one of a set point, a travel time, and an operational mode, the operational mode identifying one of a direct action mode and a reverse action mode.

3. The non-transitory computer-readable storage medium of claim 1, wherein the plurality of configuration parameters includes at least one of a building device type, a device identifier, and a network address.

4. The non-transitory computer-readable storage medium of claim 1, wherein the application further comprises instructions for displaying a visual representation of the building device on the display.

5. The non-transitory computer-readable storage medium of claim 1, wherein the application further comprises instructions for displaying a hyperlink on the display, the hyperlink selectable to direct a user to additional information regarding the building device.

6. The non-transitory computer-readable storage medium of claim 1, wherein the application further comprises instructions for providing an indication that the modified or replaced set of configuration parameters was transmitted successfully to the building device.

7. The non-transitory computer-readable storage medium of claim 1, wherein the application further comprises instructions for displaying diagnostic data regarding operation of the building device.

8. The non-transitory computer-readable storage medium of claim 7, wherein the application further comprises instructions for displaying the configuration parameter update on the display.

9. A mobile device for configuring a building device of an HVAC system, comprising:
a display; and
a processor configured to:
receive data associated with at least one of diagnosis and operation of the building device, the data received from the building device using near field communication (NFC);
display the data on the display;
responsive to a command entered on a user interface of the mobile device, update the display to display a log of communications made using NFC with the building device on a logging screen wherein the log of the communications includes time stamps corresponding with the communications, wherein the logging screen provides at least a portion of the operational data and the time stamps corresponding to the at least the portion of the operational data;
receive a configuration parameter update, the configuration parameter update replacing or modifying at least one of the configuration parameters; and
transmitting the configuration parameter update to the building device via NFC.

10. The mobile device of claim 9, wherein the log is stored on the building device.

11. The mobile device of claim 9, wherein the user interface provides a clear all command for deleting information in the log.

12. The mobile device of claim 9, wherein the user interface provides a save command for saving information in the log.

13. The mobile device of claim 9, wherein the building device includes a flow sensor.

14. The mobile device of claim 9, wherein the processor is further configured to receive a configuration parameter of the building device from the building device via NFC between the mobile device and the building device and display the configuration parameter on the display.

15. The mobile device of claim 14, wherein the processor is further configured to display a help video related to NFC operations in response to a user request for the help video.

16. The mobile device of claim 14, wherein the configuration parameter includes a set point for the building device.

17. A device interface application for a mobile device and for use with a building device, the device interface application comprising instructions causing the mobile device to:
receive a plurality of configuration parameters of the building device from the building device using near field communication (NFC);
receive logging data associated with the building device from the building device using NFC, the logging data comprising operational data and time stamps corresponding to the operational data;
display the plurality of configuration parameters on a display;
responsive to a command entered on a user interface of the mobile device, updating the display to display at least a portion of the logging data in a logging screen on the display, wherein the logging screen provides at least a portion of the operational data and the time stamps corresponding to the at least the portion of the operational data; and
provide a configuration parameter update to the building device via NFC in response to at least one of a write commend provided using the mobile device or a write and lock command using the mobile device.

18. The device interface application of claim 17, wherein the instructions further cause the mobile device to display data associated with operation of the building device, the data received from the building device via NFC.

19. The device interface application of claim 17, wherein the plurality of configuration parameters includes at least one of a set point, a travel time, and an operational mode, the operational mode identifying one of a direct action mode and a reverse action mode.

20. The device interface application of claim 17, wherein the instructions further cause the mobile device to display the configuration parameter update on the display and provide an indication on the display that the configuration parameter update was transmitted successfully to the building device.

* * * * *